US010502184B2

(12) United States Patent
Bray

(10) Patent No.: US 10,502,184 B2
(45) Date of Patent: Dec. 10, 2019

(54) POWER GENERATING DEVICE

(71) Applicant: Robert Reginald Bray, Johannesburg (ZA)

(72) Inventor: Robert Reginald Bray, Johannesburg (ZA)

( * ) Notice: Subject to any disclaimer, the term of this patent is extended or adjusted under 35 U.S.C. 154(b) by 470 days.

(21) Appl. No.: 15/511,169

(22) PCT Filed: Sep. 16, 2015

(86) PCT No.: PCT/ZA2015/000059
§ 371 (c)(1),
(2) Date: Mar. 14, 2017

(87) PCT Pub. No.: WO2016/074005
PCT Pub. Date: May 12, 2016

(65) Prior Publication Data
US 2019/0085820 A1 Mar. 21, 2019

(30) Foreign Application Priority Data

Sep. 17, 2014 (ZA) .................................. 2014/06802

(51) Int. Cl.
*F03D 3/06* (2006.01)
*F03D 7/06* (2006.01)
(Continued)

(52) U.S. Cl.
CPC ............ *F03D 3/068* (2013.01); *F03B 17/067* (2013.01); *F03D 3/005* (2013.01); *F03D 7/06* (2013.01);
(Continued)

(58) Field of Classification Search
CPC ........ F03D 3/068; F03D 17/067; F03D 3/005; F03D 7/06; F03D 9/32; F05B 2210/16;
(Continued)

(56) References Cited

U.S. PATENT DOCUMENTS

| 78,557 A | 6/1868 | Virdin |
| 584,367 A | 6/1897 | Keller |

(Continued)

FOREIGN PATENT DOCUMENTS

| CA | 1049856 | 3/1979 |
| CA | 2556702 | 8/2005 |

(Continued)

OTHER PUBLICATIONS

International Search Report and Written Opinion dated Jul. 15, 2016 in International Patent Application No. PCT/ZA2015/000059.

*Primary Examiner* — Aaron R Eastman
(74) *Attorney, Agent, or Firm* — Haugen Law Firm PLLP

(57) ABSTRACT

The invention relates to a renewable energy power generating device for converting wind and/or water-flow energy into useable electrical power. The power generating device includes a support structure (112 A) rotatable about a first axis of rotation (C), a plurality of aerofoil blades rotatably mounted on the support structure (112 A) and free to rotate relative thereto about a second axes of rotation (Q) substantially parallel to and radially spaced from the first axis of rotation (C), and a means (162, 166, 168) for actuating the aerofoil blades (114) between first (114 A) and second (114 B) reflexed camber aerofoil section conditions such that the aerofoil blades (114) are freely rotatable to automatically set an angle of attack relative to a fluid flow direction (D) thereby to generate a lift force thereover and transmitting a torque to the support structure (112 A) to drive it through a repeating 360 degree rotary cycle.

25 Claims, 10 Drawing Sheets

(51) Int. Cl.
*F03B 17/06* (2006.01)
*F03D 3/00* (2006.01)
*F03D 9/32* (2016.01)

(52) U.S. Cl.
CPC .......... *F03D 9/32* (2016.05); *F05B 2210/16* (2013.01); *F05B 2240/301* (2013.01); *F05B 2240/311* (2013.01); *F05B 2240/931* (2013.01); *F05B 2260/506* (2013.01); *F05B 2260/72* (2013.01)

(58) Field of Classification Search
CPC .......... F05B 2240/30; F05B 2240/301; F05B 2240/31; F05B 2240/311; F05B 2240/931; F05B 2260/506; F05B 2260/72
USPC ........................................................ 416/111
See application file for complete search history.

(56) References Cited

U.S. PATENT DOCUMENTS

| | | | |
|---|---|---|---|
| 857,773 A | 6/1907 | Tibbitts et al. | |
| 973,869 A | 10/1910 | Logan | |
| 1,793,743 A | 2/1931 | McHenry | |
| 1,835,018 A | 12/1931 | Marie | |
| 3,604,942 A | 9/1971 | Nelson | |
| 3,639,077 A | 2/1972 | Slates | |
| 3,984,698 A | 10/1976 | Brewer | |
| 3,993,913 A | 11/1976 | Dickman | |
| 3,995,972 A | 12/1976 | Nassar | |
| 4,048,947 A | 9/1977 | Sicard | |
| 4,095,422 A | 6/1978 | Kurakake | |
| 4,247,253 A | 1/1981 | Seki et al. | |
| 4,441,858 A * | 4/1984 | Lew ............... | F03B 17/067 17/67 |
| 4,472,149 A | 9/1984 | Ballantine | |
| 4,717,831 A | 1/1988 | Kikuchi | |
| 4,832,569 A | 5/1989 | Samuelsen et al. | |
| 5,577,882 A | 11/1996 | Istorik et al. | |
| 8,100,650 B2 | 1/2012 | Siegel et al. | |
| 8,120,196 B1 | 2/2012 | Neese | |
| 2008/0247872 A1 | 10/2008 | Akcasu | |
| 2009/0309368 A1 | 12/2009 | Kumano | |
| 2010/0052327 A1 | 3/2010 | Moreland | |
| 2011/0163549 A1 | 7/2011 | Son | |
| 2012/0019003 A1 | 1/2012 | Hu | |
| 2013/0313833 A1 | 11/2013 | Bang | |

FOREIGN PATENT DOCUMENTS

| | | |
|---|---|---|
| EP | 1849999 | 10/2007 |
| GB | 2214477 | 9/1989 |
| GB | 2400413 | 10/2004 |
| GB | 2477872 | 8/2011 |
| WO | 0040859 | 7/2000 |
| WO | 2011031132 | 3/2011 |
| WO | 2011113424 | 9/2011 |
| WO | 2012000025 | 1/2012 |
| WO | 2012102518 | 8/2012 |

* cited by examiner

POWER GENERATING DEVICE

BACKGROUND

THIS invention relates to a power generating device. More specifically, the invention relates to a renewable energy power generating device for converting wind and/or water-flow energy into useable electrical power.

Renewable energy power generating devices are well known, with most known devices typically converting wind and/or water-flow energy into reciprocating or rotary mechanical energy for driving some form of generator for producing electrical power.

Although this present invention may be configured to produce a reciprocating motion for driving a generator, a rotary-type motion is preferable in that such motion is smooth, continuous and, at least for extended periods, moving in a single direction.

When the concepts of wind powered devices (i.e. turbines) and/or water powered devices (i.e. waterwheels) were first being explored, most such devices incorporated blades with relatively large surface areas to capture passing wind or water-flow thereby to drive the blade in the direction of flow and power the turbine.

The disadvantage of such devices is that the blades do not provide drive continuously throughout the cycle. Typically, the cycle is broken substantially into a drive phase, where the blades are driven in the direction of flow, and a return phase, where the blades move against the flow to return to the start of the drive phase.

During the return phase of the cycle, the blades moving against the flow create drag, significantly reducing the efficiency of these devices. Many attempts have been made to address the disadvantage of drag created during the return phase. One such attempt is by pivoting the blade during the return phase into a condition offering less drag. Another attempt, and one that is of far more interest in respect of the present invention, is by replacing the large surface area resistive blades with wing-type blades (i.e. aerofoil or hydrofoil blades), which generate drive as a result of creating lift.

Most of the known wing-type turbine or waterwheel devices, for example the one taught by Monagahn in international patent application no. PCT/AU2011/000793 (published as no. WO 2012/000025), incorporate a plurality of symmetrical section aerofoil blades pivotally connected to a waterwheel structure having systems to pivotally control their respective angles of attack throughout rotation of the waterwheel thereby to orientate the blades correctly relative to the direction of flow to produce lift.

Typically, these control systems drive pivotal movement of the aerofoil blades about their respective pivot axis on the waterwheel by internal drive mechanisms (i.e. gearing between the blade and the pivot axis), or alternatively by making use of external ailerons at leading and/or trailing edges of the blades.

There are however at least two significant shortcomings in respect of these known wing-type turbine or waterwheel devices. Firstly, the control systems (particularly the external type) are overly complicated and exposed to damaging forces and corrosive elements especially in high current deep-sea applications.

Secondly, to enable lift to be generated throughout the cycle, the use of symmetrical section aerofoil blades at first glance appears to be the obvious solution. However, symmetrical section aerofoil sections, as opposed to non-symmetrical lift generating aerofoil sections, do not offer optimum lift characteristics.

As such, to address the shortcomings of the prior art, there is a need for a turbine/waterwheel type device having non-symmetrical lift generating aerofoil section blades. However, such blades must be configurable in such a manner to produce lift substantially throughout the rotational cycle. It is envisaged that this may be attainable by incorporating either an inverting fixed profile non-symmetrical aerofoil section blade, or a reversible variable camber aerofoil section blade, the latter being the preferable option.

Furthermore, incorporation of a reflexed camber into either of the abovementioned fixed or variable profile non-symmetrical aerofoil section blades will enable the blades to automatically orientate to the optimum angle of attack without having to pivotally drive the blades into the required position. In so doing, it is envisaged that the control systems required will be simple and housed substantially within the aerofoil blade, thereby protecting the control system from external damaging forces.

For background purposes, the camber of an aerofoil or wing can be defined by a mean camber line, which is the curve or line that is somewhat between the upper and lower surfaces of the aerofoil and passing through the aerofoil's leading and trailing edges, that is, the forward most and rear most points of the wing respectively. An aerofoil where the camber line reverses curvature direction near the trailing edge is called a reflexed camber aerofoil.

Reflex aerofoils are the type of section used in flying wing aircraft due to the inherent tendency of the shape to induce a rotational moment to the trailing edge of the wing, so as to replace the more traditional tail plane surface that is used to maintain the wing at a stable positive angle of attack. This wing section, when used in a flying wing or blended wing/fuselage configuration, has considerable advantages in aircraft design where the omission of the tail boom and tail plane reduces drag by a large factor. The advantages offered by reflexed camber aerofoil sections in aircraft applications are clearly transposable to turbine type applications.

It will be appreciated that the preferred embodiment of the aerofoil blade that forms part of the present invention is functionally the same or similar to the wing invention described in the inventor's previously filed international patent application no. PCT/ZA2013/000090 (published as no. WO 2014/085835), fully incorporated hereinto by reference.

It will be appreciated further that reference to the term aerofoil will be understood to include any lift generating member such as wings, hydrofoils, etc.

SUMMARY OF THE DISCLOSED EMBODIMENTS

A power generating device including:
a support structure;
one or more mounts for rotatably mounting the support structure, the support structure being rotatable on the mount(s) about a first axis of rotation;
a plurality of aerofoil blades each being rotatably mounted on the support structure and freely rotatable relative thereto about a respective second axis of rotation, the second axes of rotation each being substantially parallel to and radially spaced from the first axis of rotation; and
a means of actuating each of the aerofoil blades between a first condition, wherein the aerofoil blade has a first lifting aerofoil section for generating a lift force in a first direction thereby to impart a torque on the support structure in a first rotational direction, and a second condition, wherein the aerofoil blade has a second lifting aerofoil section for generating a lift force in a second direction to impart a torque on the support structure in the same first rotational direction such that the support structure is operatively driveable in repeating 360 degree rotary cycles;

wherein the first and the second lifting aerofoil sections are: (i) reversed sections of one another; and (ii) reflexed camber aerofoil sections; such that in use fluid flow acting over the aerofoil blades automatically sets an angle of attack of the aerofoil blades relative to the direction of the fluid flow; and further wherein the actuating means operably deforms or inverts the aerofoil blades between the first and second conditions.

Typically, the first and second lifting aerofoil sections are mirrored section of one another.

The power generating device may further include a means for orientating the support structure and the actuating means relative to the direction of the fluid flow in an aligned condition thereby to enable the actuating means to operatively actuate deformation or inversion of the aerofoil blades between the first and second conditions at predetermined transition regions along the rotary cycle and relative to the fluid flow during respective transition phases.

Generally, the actuating means and the supporting structure are fixed relative to one another with at least the support structure mounted on the mounts within a housing defining an inlet, an outlet and a flow path extending there between for enabling fluid flow operatively passing through the housing to impinge on the support structure, the orientating means being located on the housing and in use, orientates the housing such that, in the aligned condition, the flow path is substantially aligned with the direction of the fluid flow with the inlet thereof upstream of the outlet.

Alternatively, the actuating means is rotatable relative to the supporting structure, and further wherein the orientating means is connected to the actuating means thereby to move the actuating means about the first axis of rotation such that both the support structure and the actuating means are operatively orientated to the direction of the fluid flow in an aligned condition to enable the actuating means to operatively actuate deformation or inversion of the aerofoil blades at the predetermined transition regions along the rotary cycle and relative to the fluid flow during the respective transition phases.

Preferably, the orientating means is one or more fins for steering the housing or actuating means into the aligned condition, the actuating means being an electric, an electronic or a mechanical actuating means. It will be appreciated that the orientating means may be, instead of fins, in other forms. For example, propellers or jets may be used to push the housing and/or actuating means into the aligned condition.

Generally, the flow path defined in the housing between the inlet and outlet thereof has a narrowing within or near which the support structure is mounted thereby to operatively increase the flow rate of the flow passing there through. Furthermore, a recess may be defined at or near the narrowing thereby to reduce and/or counter drag generated by the aerofoil blades as they pass through the recess.

Typically, the housing is:

(i) rotatably mounted to the ground thereby enabling the housing to operatively rotate into the aligned condition; and/or (ii) buoyant and tethered in a submerged state thereby enabling the housing to operatively drift into the aligned condition.

It will be appreciated that at least the support structure, the aerofoil blades rotatably mounted thereon and the actuating means make up a drive set, with the housing capable of housing a plurality of drive sets therein. Preferably, the housing houses an even number of counter rotating drive sets thereby to minimise torque effects on the housing.

The housing may include a guard at or near the inlet for preventing solid materials and/or sea animals of a size greater than a predefined maximum to enter the housing, and/or a diffuser near the outlet of the housing.

Typically, the mechanical actuating means is made up of:
(i) a cam member;
(ii) at least one cam follower associated with each of the aerofoil blades, wherein the cam follower is operatively caused to reciprocally move as it rides along a profile of the cam member as the support structure rotates through the rotary cycle;
(iii) deforming or inverting actuators for respectively actuating deformation or inversion of the respective aerofoil blade; and
(iv) means for transmitting the reciprocal movement of the cam follower to the deforming or inverting actuators of the respective aerofoil blade thereby to operatively retain the aerofoil blade in the first or second condition, and/or to deform or invert the aerofoil blade between the first and second conditions during the transition phases.

Generally, the cam member is mounted remotely from the support structure with the first axis of rotation passing there through, and the cam followers are mounted on the support structure.

Preferably, the aerofoil blades on diametrically opposing sides of the support structure, across a diametric axis passing through the first axis of rotation, are deformable or invertible during the transition phases between the first and second conditions.

It will be appreciated that the aerofoil blades on the support structure, lying on:
(i) a first side of the diametric axis and spaced therefrom, are generally retainable by the actuating means in the first condition operatively during a primary drive phase of the rotary cycle; and
(ii) a second side of the diametric axis and spaced therefrom, are typically retainable by the actuating means in the second condition operatively during a secondary drive phase of the rotary cycle;
such that in use, the rotary cycle is made of a primary drive phase—transition phase—secondary drive phase—transition phase sequence, where the drive phases and transition phases are located along diametrical opposing drive phase segments and the transition phases segments about the first axis of rotation.

The aerofoil blades each have opposing leading and trailing edges and, operatively under the force of the fluid flow acting there over, automatically rotate to set an angle of attack with the aerofoil blades lying on both sides of the diametric axis being orientated such that their respective leading edges are upstream of their trailing edges.

Generally, the support structure, relative to the first axis of rotation, comprises a plurality of radially extending booms on which the aerofoil blades are supported, the aerofoil blades being rotatably and pivotally mounted on the booms thereby to enable the aerofoil blades to invert under the actuation of the inverting actuators during the transition phases, and further wherein the aerofoil blades have a static reflexed camber aerofoil section.

Typically, the aerofoil blades have opposing first and second ends across which the leading and trailing edges extend thereby defining a blade span, and further wherein the aerofoil blades are rigid or collapsible across such blade spans.

In an alternative embodiment of the invention, the aerofoil blades have a deformable aerofoil section and capable of, on actuation thereon by the actuating means, deforming between the first and second conditions fully or incrementally.

It will be appreciated the aerofoil sections of the deformable aerofoil blades may have a sliding joint. Preferably, however, the aerofoil sections of the deformable aerofoil blades have a continuous closed loop form, each of the aerofoil sections comprising of a first aerofoil segment and a second aerofoil segment having ends connected or fixed to one another at the opposing leading and trailing edges thereby preventing the ends of the first and second aerofoil segments from sliding relative to one another, wherein the first and second aerofoil segments are spaced apart from one another along their lengths across a neutral mean camber line extending between the leading and trailing edges to form the aerofoil section of the aerofoil blade, and further wherein the trailing edge is free to move across the neutral camber line.

It will be appreciated that:
(i) the deforming actuators deform the aerofoil blade between the first and the second conditions;
(ii) the first and second aerofoil segments are resilient to bias the aerofoil blade towards a symmetrical transition condition through which condition the aerofoil blade passes as it is deformed between the first and second conditions; and
(iii) the critical buckling load of the aerofoil segments is greater than a compressive load generated in the aerofoil segments by the deforming actuators during deformation thereof between the transition condition and the first and second conditions;
such that when the aerofoil blade is deformed, displacement between two points on one of the aerofoil segments generates the compressive load in at least such aerofoil segment, and the ability of such aerofoil segment to resist the compressive load cases such segments to adopt the reflexed camber aerofoil section form having a reflexed camber line with a point of inflection located nearer the trailing edge than to the leading edge, with the trailing edges on the aerofoil blades on opposite sides of the diametric axis being flicked towards opposite directions.

Generally, the dimension of maximum thickness of aerofoil section in the first and second conditions is greater than the dimension of maximum thickness of the aerofoil section in the transition condition. It is envisaged that a change in dimension of maximum thickness between either of the first and second conditions and the transition condition of up to about 4:1 is attainable.

The first and/or second aerofoil segments may:
(i) each be formed from a single aerofoil member spanning between the leading and trailing edges, jointly forming a continuous closed loop aerofoil rib;
(ii) each be formed from a plurality of aerofoil members connected or fixed end-to-end between the leading and trailing edges, jointly forming a continuous closed loop aerofoil rib;
(iii) be a single integral aerofoil member forming a continuous closed loop aerofoil rib such that the aerofoil blade comprises a plurality of aerofoil ribs spaced apart relative to one another to define an elongate aerofoil blade framework for supporting a flexible or semi-rigid skin there over, the skin being a continuous closed loop skin member having a trailing edge coinciding with the trailing edge of the aerofoil blade framework; or
(iv) be opposing first and second members of an elongate aerofoil shell spaced apart from one another across the neutral camber line, the first and second members each being single aerofoil members, a plurality of aerofoil members connected or fixed end-to-end, or integral with one another to form a continuous closed loop aerofoil section, wherein the outer surface of the shell is a skin over which fluid is flowable in use, and further wherein the shell is self-supporting and semi-rigid.

Typically, the aerofoil blades have opposing first and second ends across which the leading and trailing edges extend thereby defining a blade span, and further wherein the aerofoil blades are rigid or collapsible across such blade spans.

Preferably, the collapsible aerofoil blades comprise a plurality of aerofoil ribs spaced relative to one another across the blade span of the aerofoil blades, and further wherein the first and second ends of the aerofoil blades are movable relative to one another between an erected condition, wherein the first and second ends of the aerofoil blades are spaced remotely from one another thereby to stretch the skin member between such ends and over the aerofoil ribs spaced there between, and a collapsed condition, wherein the first and second ends of the aerofoil blades are brought into close proximity with one another, consequently causing the aerofoil ribs to collapse onto or into one another.

The deforming actuators may be configured to act on one or more movable actuating members of an actuating structure substantially located within a hollow interior of the respective aerofoil blade and in contact with or connected to actuator points on the aerofoil blade, the movable actuating members being movable on actuation thereon by the actuating means and deforming actuators to impart a primary deforming force for displacing one or more actuator points on the first and second aerofoil segments thereby to deform the aerofoil blade section between the transition condition and the first and/or second reflexed camber aerofoil section conditions.

Furthermore, the power generating device may include one or more biasing means for imparting, together with the primary deforming force, a secondary deforming force for aiding in the displacement of the actuator points, thereby reducing the load on the deforming actuators to deform the aerofoil blades between the transition condition and the first and/or second reflexed camber aerofoil section conditions, the aerofoil blades being resiliently biased towards the transition condition.

Generally, the one or more biasing means are springs acting between a fixed point within the hollow interior of the aerofoil blade and a movable point on the movable actuating members or aerofoil blade.

Typically, the actuating structure comprises:
a primary spar located within the hollow interior of the aerofoil blade;

a pair of the movable actuating members, each having first ends movably connected to the primary spar and second ends connected to or abutting the actuator points on one or the other of the first and second aerofoil segments of the aerofoil blade; and the biasing means in the form of a spring, associated with each movable actuating member, and connected at one end to the movable actuating member or the respective aerofoil segment and at the opposite end to the fixed point, the fixed point being on the primary spar and nearer the leading edge of the aerofoil blade than the point at which the movable actuating members are movably connected to the primary spar.

Preferably, the actuating structure further comprises:

a secondary spar located within the hollow interior of the aerofoil blade such that the primary and secondary spars are located closer to the leading and trailing edges of the aerofoil blade respectively, the secondary spar being connected to or abutting secondary actuator points on one or the other of the first and second aerofoil segments of the aerofoil blade; and an elongate actuating connector extending from the primary spar at one end thereof and having a second end pivotally connected to the secondary spar.

More preferably, the actuating structure is constructed into each aerofoil rib, with the primary spar being part of or movable on a collapsible mast through which the second axis of rotation of the aerofoil blades operatively extends.

Generally, the aerofoil blades are rotatably mounted on the support structure by: (i) a mounting shaft about which the mast is rotatable; or (ii) on stub masts extending from each of the first and second ends of the aerofoil blade.

Typically, the support structure is a pair of discs spaced apart by the aerofoil blades rotatably mounted there between, and further wherein the support structure comprises a power take-off from which the rotary movement of the support structure is operatively capable of being drawn from for driving a power generation means for operably converting the mechanical energy of the support structure into electrical energy.

According to a second aspect of the invention, there is provided a power generating installation including:

a rotatably mounted support structure being rotatable about a first axis of rotation;

a plurality of aerofoil blades rotatably mounted on the support structure and freely rotatable relative thereto about a respective second axis of rotation being substantially parallel to and radially spaced from the first axis of rotation;

the support structure being drivable in repeating 360 degree rotary cycles by lift forces imparted thereon by the aerofoil blades and generated from fluid flow passing there over in a fluid flow direction;

wherein the aerofoil blades, in a transition region of the support structure where a transition line that passes through the first axis of rotation is perpendicular to the fluid flow direction, is deformable or invertible between:

(i) a first condition, during a primary phase of the rotary cycle, in which the aerofoil blades have a first reflexed camber aerofoil section for generating a lift force in a first direction thereby to impart a torque on the support structure in a first rotational direction; and (ii) a second condition, during a secondary phase of the rotary cycle, in which the aerofoil blades have a second reflexed camber aerofoil section for generating a lift force in a second direction thereby to impart a torque on the support structure in the first rotational direction;

and further wherein the aerofoil blades are freely rotatable throughout the rotary cycle in response to forces induced on the aerofoil blades by fluid flow passing there over; and a power generation means for operably converting the mechanical energy of the support structure into electrical energy.

It will be appreciated that reference in this specification to "substantially parallel", "substantially perpendicular" and "substantially aligned" will be understood to respectively mean parallel, perpendicular and aligned, or any variance therefrom of up to 10 degrees.

Generally, the region, with reference to the first axis of rotation, is a pair of diametrically opposing transition sectors overlying the transition line.

According to a third aspect of the invention, there is provided a power generating method including the steps of:

(A) exposing a plurality of aerofoil blades rotatably mounted on a support structure to a fluid flow thereby to generate lift forces and rotatably drive the support structure about a first axis of rotation in repeating 360 degree rotary cycles;

(B) deforming or inverting the aerofoil blades, in a transition region of the support structure where a transition line that passes through the first axis of rotation is perpendicular to the fluid flow direction, between:

(i) a first condition, during a primary phase of the rotary cycle, in which the aerofoil blades have a first reflexed camber aerofoil section for generating a lift force in a first direction thereby to impart a torque on the support structure in a first rotational direction; and (ii) a second condition, during a secondary phase of the rotary cycle, in which the aerofoil blades have a second reflexed camber aerofoil section for generating a lift force in a second direction thereby to impart a torque on the support structure in the first rotational direction;

(C) converting the mechanical energy of the support structure into electrical energy;

wherein the aerofoil blades are freely rotatable throughout the rotary cycle in response to forces induced on the aerofoil blades by fluid flow passing there over.

BRIEF DESCRIPTION OF THE DRAWINGS

These and other features and advantages of the present device, system, and method will become appreciated as the same becomes better understood with reference to the specification, claims and appended drawings where:

FIG. 10 is a perspective view of an aerofoil blade with aerofoil shell or skin member removed there from, thereby to show the actuator structure housed with in the aerofoil blade;

DETAILED DESCRIPTION OF THE DRAWINGS

Figure 1:
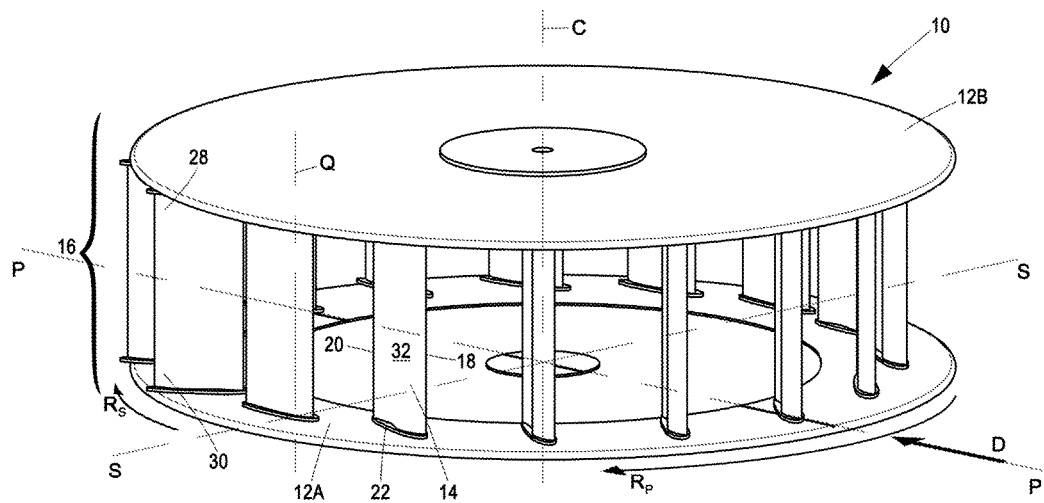
FIG. 1 is a perspective view of a first embodiment of a drive set of a power generating device in accordance with the present invention.
Figure 2:
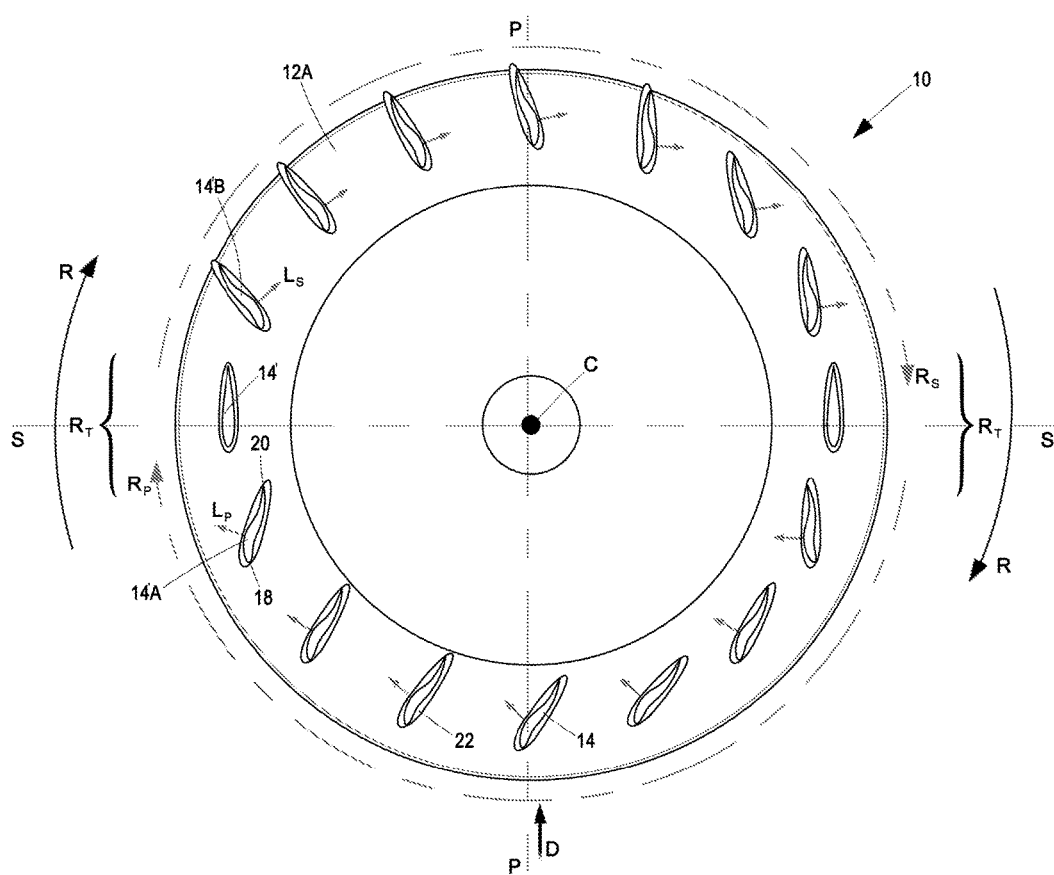
FIG. 2 is a top view of the drive set of FIG. 1.

A power generating device according to a preferred embodiment of the invention is designated generally in FIGS. 1 and 2 with reference numeral 10. The power generating device 10 includes at least a support structure 12A, 12B, a plurality of aerofoil blades 14 pivotally mounted on the support structure 12A, 12B and a means 60 for actuating deformation of the aerofoil blades 14 between first and second fully reversible reflexed camber aerofoil section conditions.

For the purposes of this description, the aforementioned support structure 12A, 12B, the aerofoil blades 14 and the actuating means jointly form a drive set 16 rotatable about a first axis of rotation "C", with the aerofoil blades 14 being freely rotatable relative to the support structure 12A, 12B about respective second axis of rotation "Q".

It will be appreciated that although the drive set 16 has been represented in the figures as being rotatable about a substantially vertical first axis of rotation "C", the drive set 16 may be configured such that the first axis of rotation "C" is substantially horizontal or at any other angle.

Although the support structure 12A, 12B has been illustrated as having a pair of disc-like wheel structures 12A and 12B spaced apart from one another by the aerofoil blades 14, it will be appreciated that the support structure may be configured with just a single wheel structure, disc-like or otherwise. For example, instead of the wheel structure being disc-like, the wheel structures may be a ring-like member on which the aerofoil blades 14 are pivotally supported with a plurality of radial connecting arms extending between the first axis of rotation "C" and such ring-like member.

With reference now also to FIG. 2, each of the aerofoil blades 14 are pivotally mounted on the support structure 12A, 12B are configurable for operably converting fluid flow energy passing there over into a lift force "L" for mechanical driving the support structure 12A, 12B through a repeating 360 degree rotary cycle "R".

The rotary cycle "R" is best described through referencing the support structure 12A in an aligned condition with an "in use" fluid flow direction "D" and at least two axes, namely a primary diametrical axis "P-P" substantially aligned with the direction of the fluid flow "D" and a secondary diametrical axis "S-S" being substantially perpendicular to the primary diametrical axis "P-P" and the fluid flow direction "D".

With reference now to the defined primary and secondary diametrical axes "P-P", "S-S", the rotary cycle "R" is substantially divided into a primary phase "$R_P$" and a secondary phase "$R_S$" by the secondary diametrical axis "S-S".

During the primary phase "$R_P$" of the rotary cycle "R", the aerofoil blades 14 are deformable by the actuating means into a first condition, wherein the aerofoil blades 14 take a first reflexed camber aerofoil section form 14'A. In response to the fluid flow passing over the aerofoil blade 14 in the first condition 14'A, and as a result of the characteristics of a reflexed camber aerofoil section and particular the ability of the trailing edge 20 thereof to induce a moment on the aerofoil section 14'A, the aerofoil blade 14 freely rotates about its second axis "Q" to automatically set an angle of attack relative to the fluid flow direction "D", operably to generate lift in a first direction "$L_P$".

For the purposes of comparison to the second condition of the aerofoil blade 14 to be described hereafter, it will be appreciated that the first reflexed camber aerofoil section form 14'A has a leading edge 18 tending away from the first direction "$L_P$" with the trailing edge 20 flicked or tending toward the first direction "$L_P$".

During the secondary phase "$R_S$" of the rotary cycle "R", the aerofoil blades 14 are deformable by the actuating means into a second condition, wherein the aerofoil blades 14 take a second reflexed camber aerofoil section form 14'B. In a similar fashion and in response to the fluid flow passing over the aerofoil blade 14 in the second condition 14'B, the aerofoil blade 14 freely rotates about its second axis "Q" to automatically set an angle of attack relative to the fluid flow direction "D", operably to generate lift in a second direction "$L_S$".

The second reflexed camber aerofoil section form 14'B has a leading edge 18 tending away from the second direction "$L_S$" with the trailing edge 20 flicked or tending toward the second direction "$L_S$" and, compared with the first reflexed camber aerofoil section form 14'A, are reversed sections thereof. At diametrically opposite sides of the support structure 12A, 12B, the first and second conditions 14'A, 14'B of the aerofoil blades are substantially mirrored sections of one another with the lift forces "$L_P$", "$L_S$" being substantially opposing.

Although it is possible to construct an embodiment of the invention with aerofoil blades 14 having incrementally variable aerofoil sections, it is preferable that the aerofoil sections are deformed fully between the first and second conditions 14'A, 14'B.

Generally, the first axis of rotation "C" is transversally, and preferably substantially perpendicularly orientated relative to both the primary and secondary diametrical axes "P-P", "S-S".

In use, lift operably generated by the aerofoil blades 14 in the first direction "$L_P$" induces rotation of the support structure 12A about the first axis of rotation "C" in a first clockwise or anticlockwise rotational direction "R", whereas lift operably generated by the aerofoil blades 14 in the second direction "$L_S$" induces rotation of the support structure 12A about the first axis of rotation "C" in the same first clockwise or anticlockwise rotational direction "R".

For lift forces to be generated by the aerofoil blades 14 in substantially varying directions to maintain rotation of the support structure 12A in a constant direction, the deformation of the aerofoil blades 14 must transition between the first and second conditions 14'A, 14'B at some point during the rotary cycle "R", namely during a transition phase "$R_T$", occurring twice within a full rotary cycle "R" within transition regions or sectors being diametrically opposite one another across the support structure 12A, 12B and substantially at the ends of each of the primary and the secondary phases "$R_P$", "$R_S$".

During the transition phase "$R_T$", the aerofoil blades 14 take a substantially neutral and symmetrical aerofoil section shape 14', towards which the aerofoil blades 14 are ideally biased. Throughout the rotary cycle "R", the aerofoil blades 14 are freely rotatable about their respective second axis of rotation "Q" thereby to direct the leading edges 18 thereof into the direction of fluid flow "D" to continuously adjust their respective angles of attack.

It will be appreciated that the manner in which the aerofoil blades 14 are deformed, more specifically the configuration of the actuating means employed, may take many different forms.

Figure 3A:
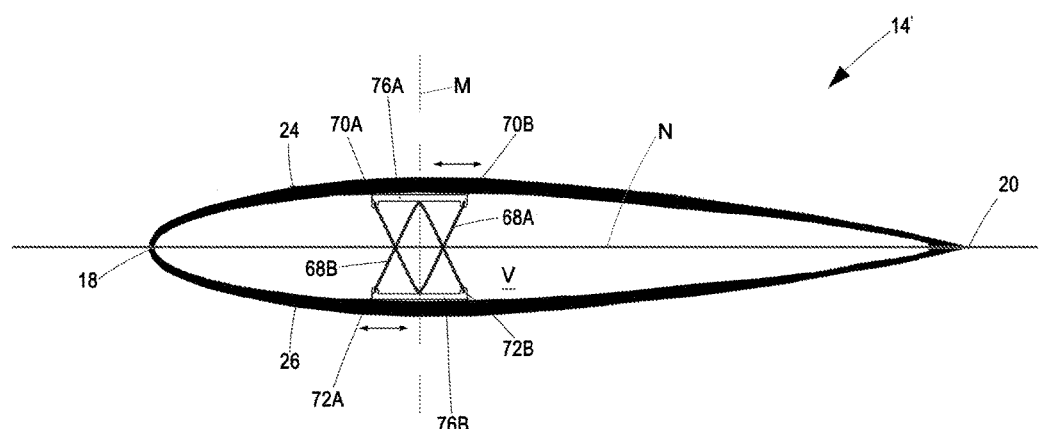
FIG. 3A-C are cross-sectional top views of an aerofoil blade, depicting a symmetrical transition aerofoil section condition, as well as each of first and second reflexed camber aerofoil section conditions.
Figure 3B:
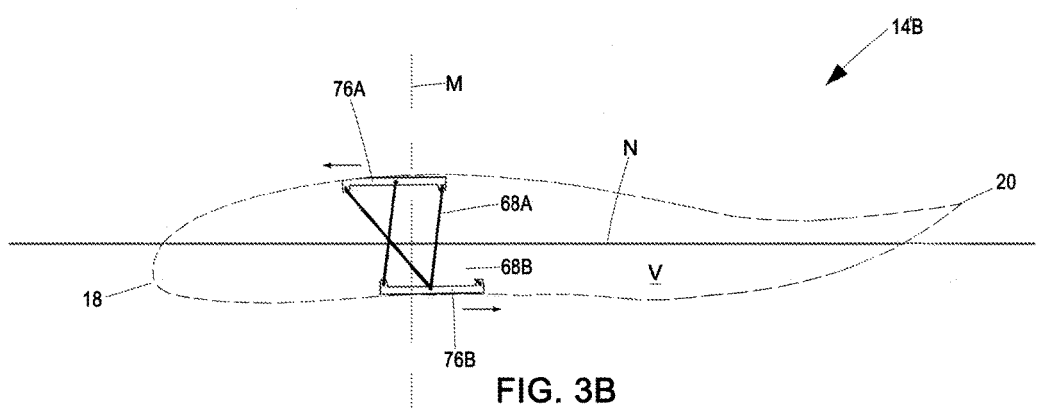
Figure 3C:
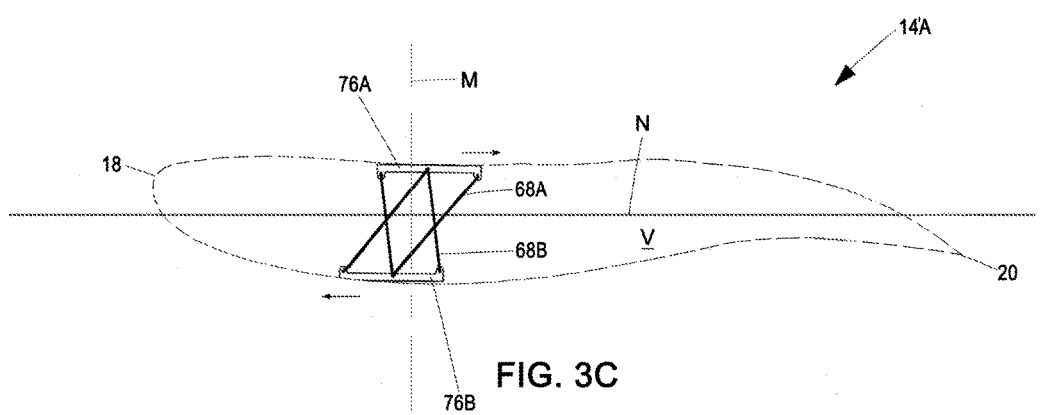
Figure 4:
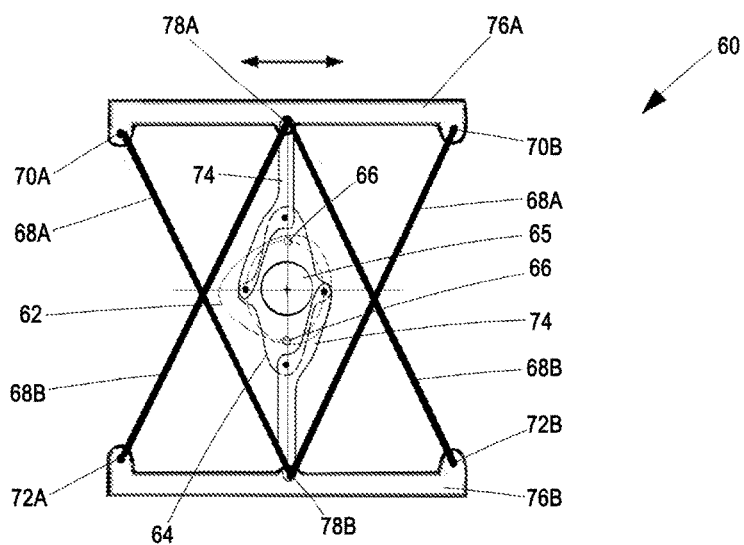
FIG. 4 is a top view of an actuating means for deforming the aerofoil section of FIGS. 3A to 3C.

FIGS. 3A to 3C, together with FIG. 4 illustrate one possible configuration of the actuating means 60, with many components thereof housed within a volume "V" of the aerofoil blades 14, thereby protecting such components from exposure to external stress and corrosive elements.

The actuating means 60 comprises a cam member 62 located on the support structure 12A, 12B, and a base plate 64 having one or more cam followers 66 mounted thereon. The base plate 64 is mounted on a shaft 65 on or about which the respective aerofoil blade 14 is rotatable, with the cam followers 66 configured to ride along a profile of the cam member 62.

The actuating means 60 further comprises an actuator structure 68, in the form of a plurality of trusses, connected to the base plate 64 and to one or more of the actuator points 70, 72 on first and second aerofoil segments 24, 26.

The base plate 64 is connected to the actuator points 70, 72 by lever arms 74 pivotally connected at first ends to the base plate 64 and pivotally connected at second ends to respective anchoring members 76A, 76B, which anchoring members are connected or fixed across the respective actuator points 70, 72 as depicted in FIGS. 3A to 3C and FIG. 4.

The actuator structure 68, is made up of primary and secondary truss member sets 68A, 68B. The primary truss member set 68A is made up of at least a pair of truss members configured in a substantial V formation and pivotally connected at first ends to the respective actuator points 70A, 70B, and pivotally connected at second ends to the respective anchoring member 76B at pivot point 78B.

Similarly, the secondary truss member set 68B is made up of at least a pair of truss members configured in a substantial V formation and pivotally connected at first ends to the respective actuator points 72A, 72B, and pivotally connected at second ends to the respective anchoring member 76A at pivot point 78A.

Figure 5:
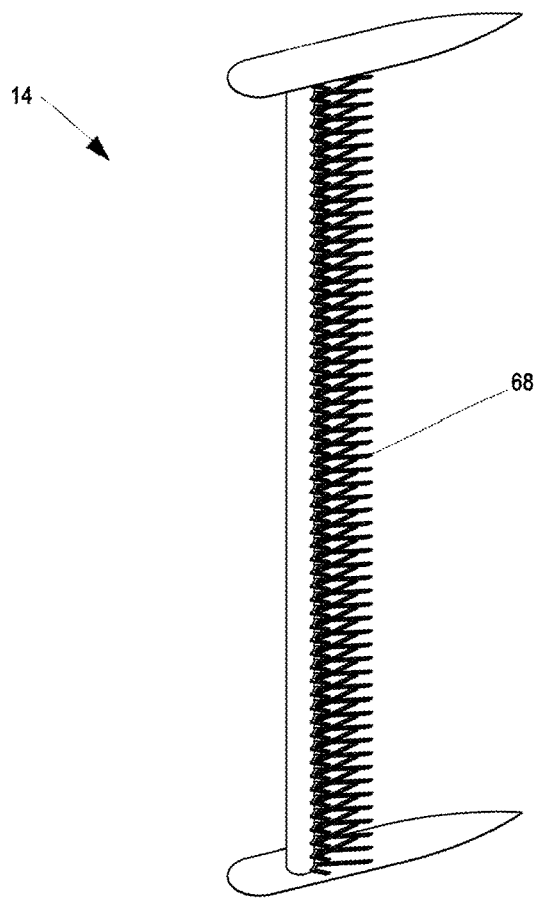
FIG. 5 is a perspective view of an aerofoil blade with the aerofoil shell or skin member removed there from, thereby to show the actuator structure housed with in the aerofoil blade.
Figure 6A:
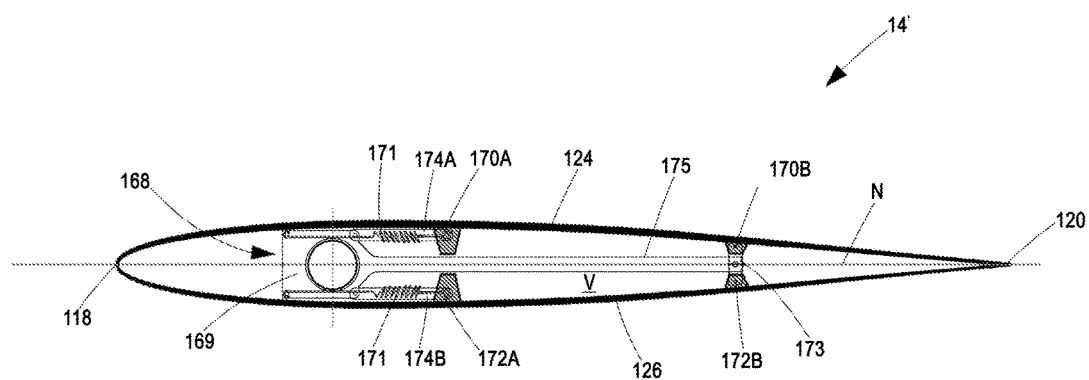
FIG. 6A-C are cross-sectional top views of an aerofoil blade, depicting a symmetrical transition aerofoil section condition, as well as each of first and second reflexed camber aerofoil section conditions, together with an alternative actuating means for deforming such aerofoil section.
Figure 6B:
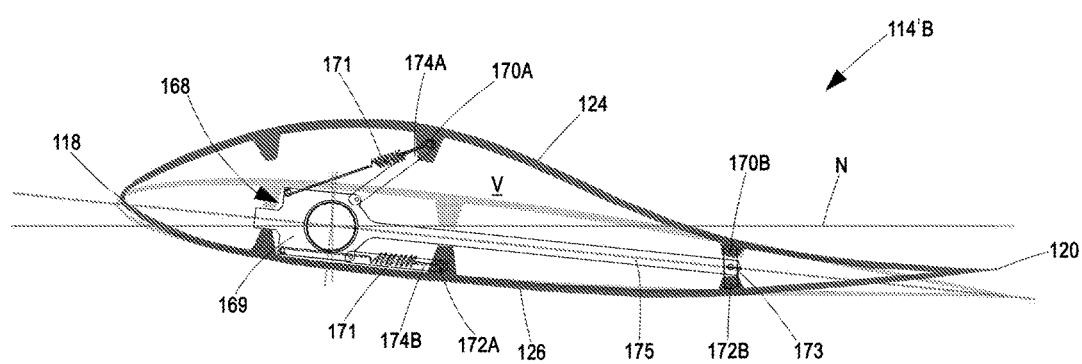
Figure 6C:
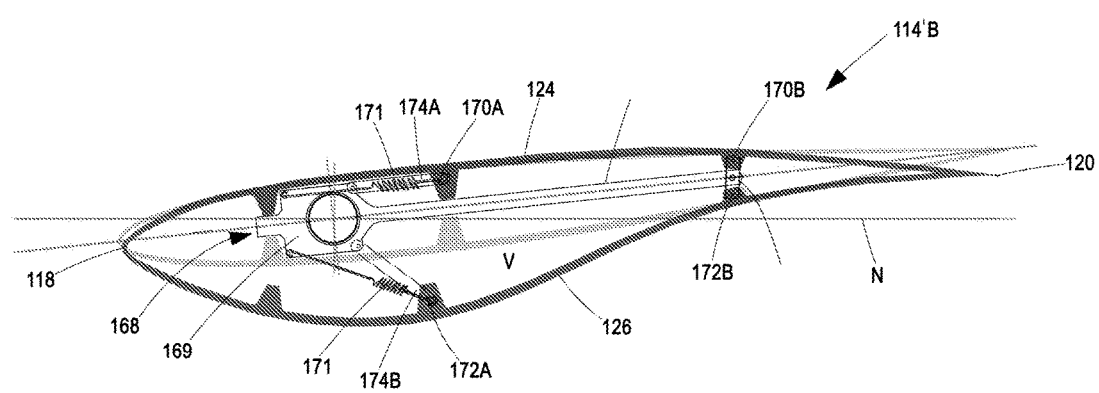

With reference now also to FIG. 5, it will be appreciated that the actuator structure is made up from a plurality of primary and secondary truss member sets 68A, 68B, spaced apart relative to one another along the span of the aerofoil blade 14 so as to create a truss lattice on which an aerofoil shell or skin member is supportable.

With reference again to FIGS. 3A to 3C and FIG. 4, relative movement in use between the cam member 62 and the base plate 64 will cause displacement of the actuator structure 68 and consequently relative displacement between the one or more actuator points 70A, 70B, 72A, 72B on the first and second aerofoil segments 24, 26.

In this manner, the aerofoil blade section 14', as depicted in FIG. 3A, is deformable into the reflexed camber aerofoil sections 14'A, 14'B, as depicted in FIGS. 3C and 3B respectively, such that the aerofoil blade 14, under a rotational force (i.e. a ruddering force) generated in use by the reflexed camber aerofoil section, is rotatable about its respective second axis of rotation "Q" to automatically set an angle of attack relative to the fluid flow direction "D".

The cam member 62 is fixed to the support structure 12A, 12B such that in use, the orientation of the cam member 62 varies with respect to the fluid flow direction "D".

Due to the aerofoil section shape 14' of the aerofoil blades 14, fluid flow passing there over in use causes a first rotation force on the aerofoil blade 14 about its respective second axis of rotation "Q" so as to substantially maintain the aerofoil blades 14 pointed into the fluid flow direction as the support structure 12A, 12B rotates about the first axis of rotation "C".

A second rotation force is in use applied to the aerofoil blade 14 by the actuating means 60, wherein a resultant force between the first and second rotational forces consequentially causes the relative movement between the cam member 62 and base plate 64 with the cam followers 66, consequently displacing the actuator structure 68 and deforming the aerofoil section 141.

FIGS. 6A to 6C, FIG. 7 and FIG. 8 illustrate a preferred alternative embodiment of the actuating means 160, with like reference numerals designating like components, on a version of the power generating device 110 wherein the support structure 112A is formed from a single base unit with the aerofoil blades 114 extending operatively upwardly therefrom.

Figure 7:
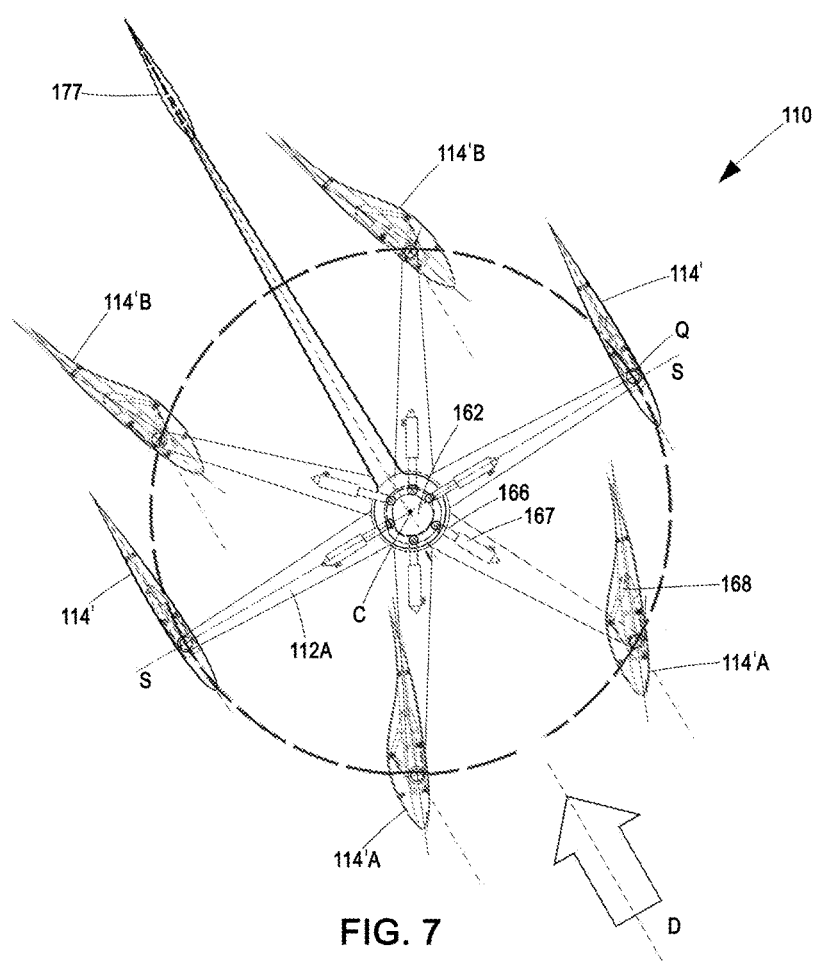
FIG. 7 is a top view of a second embodiment of a drive set of the power generating device in accordance with the present invention.
Figure 8:
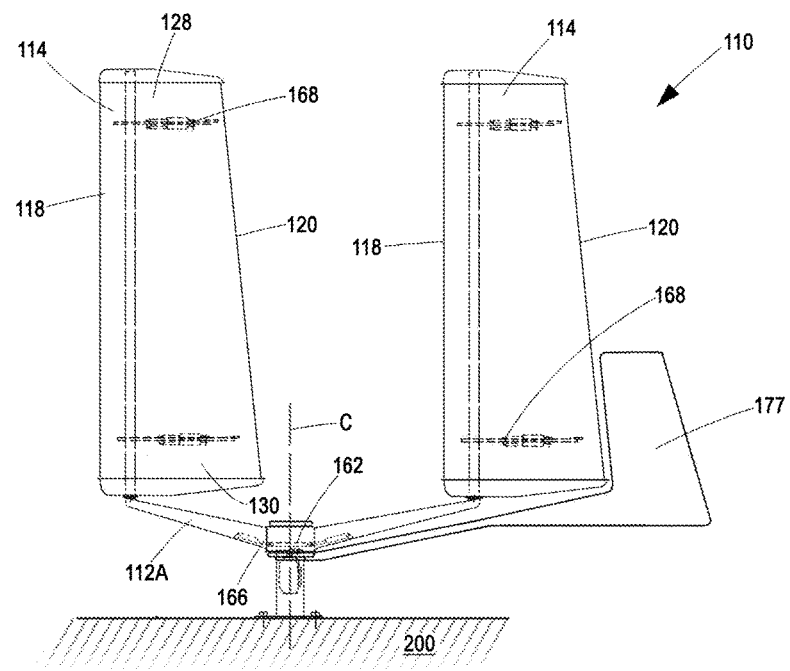
FIG. 8 is a side view of the second embodiment of the drive set of FIG. 7.
Figure 9:
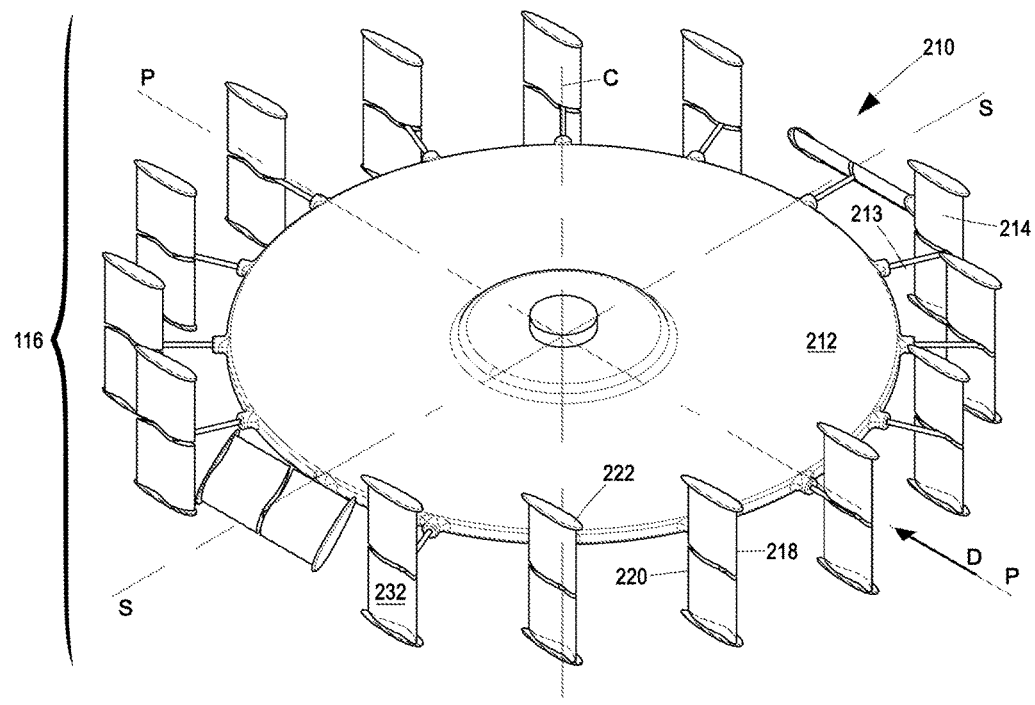
FIG. 9 is a perspective view of a third embodiment of a drive set of a power generating device in accordance with the present invention.
Figure 10:
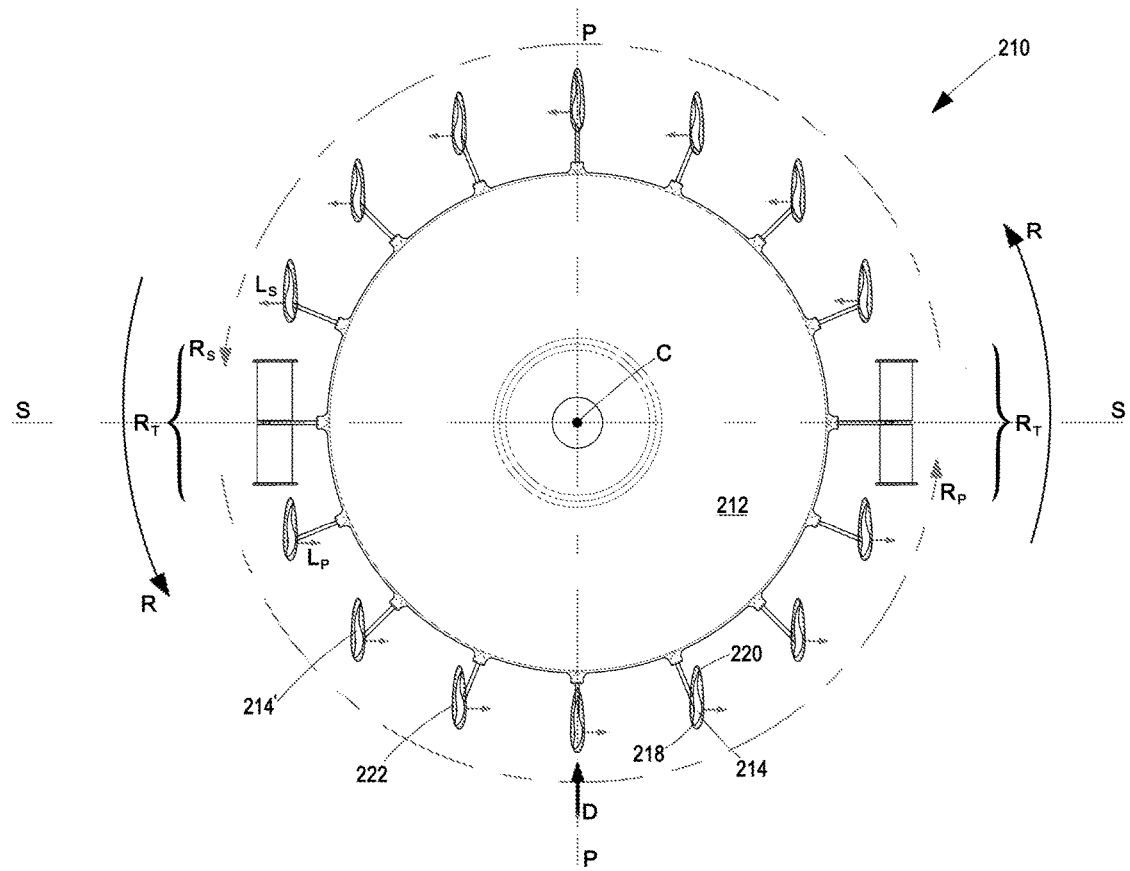
FIG. 10 is a top view of the drive set of FIG. 9.
Figure 11:
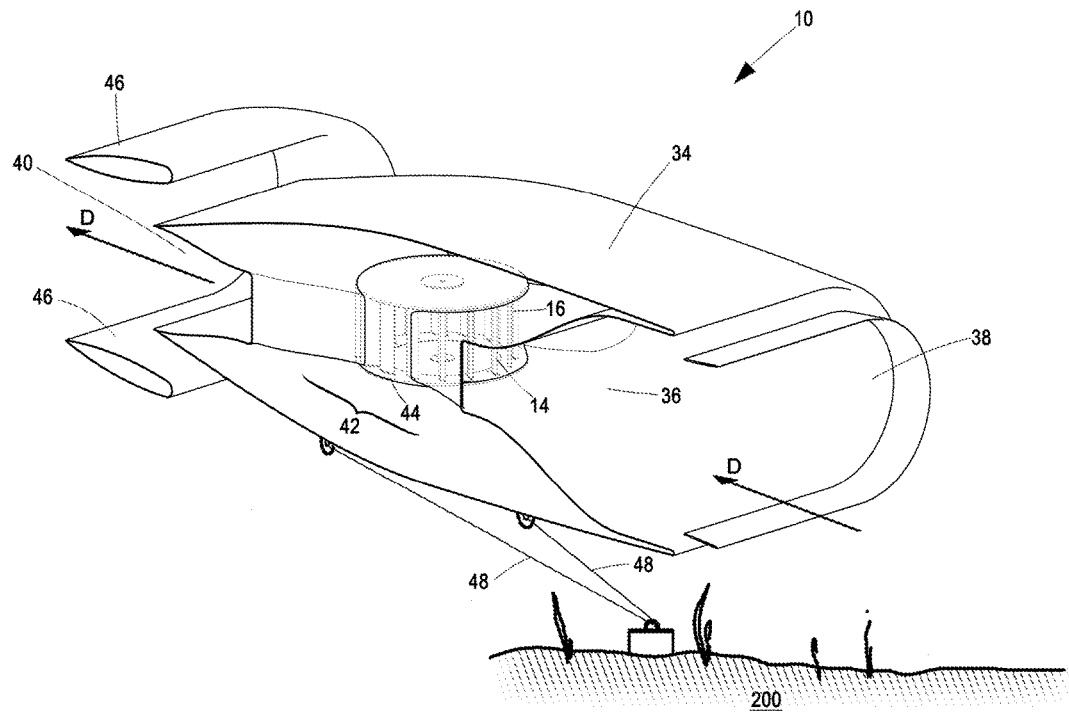
FIG. 11 is a perspective view of a preferred embodiment of the power generating device of the present invention with the drive set housed within a housing.

The actuating means comprises a cam member 162 mounted remotely from the support structure 112A, either in a fixed orientation relative to the support structure 12A (as would be the case in liquid fluid flow medium applications as depicted in FIG. 11), or rotatably about the first axis of rotation "C" as is the case for liquid or air fluid flow medium applications as depicted in FIGS. 6 to 8.

Cam followers 166 are mounted on the support structure 112A and have a first end adapted to ride along a profile of the cam member 162 and a second end extending from a means 167 of transmitting a mechanical action of the cam followers 166 to deforming actuators (not shown) for actuating an actuator structure 168 in each of the aerofoil blades 114.

It will be appreciated that the deforming actuators are typically locatable at or near each of the respective aerofoil blades 114 and that the transmitting means 167 may be any means of transmitting the mechanical action of the cam followers 166 to the deforming actuators.

For example, the deforming actuators may be in the form of servomotors, hydraulic actuators or pneumatic actuators. Similarly, the transmitting means 167 may be in the form of mechanical linkage, hydraulic actuators or pneumatic actuators.

In use, as the support structure 112A rotates about the first axis of rotation "C", the cam followers 166 following the profile of the cam member 162 are caused to reciprocate back-and-forth, which reciprocating mechanical action is induced on the transmitting means 167.

Although not shown in the accompanying figures, the mechanical action induced on the transmitting means 167 is then transmitted to the deforming actuator of the respective aerofoil blade 114 to act upon the actuator structure 168 and specifically, movable actuating members 174A, 174B in the form of lever arms.

The actuator structure 168 further comprises a primary spar 169 to which each of the lever arms 174A, 174B are pivotally connected to at respective first ends thereof, with second ends of each of the lever arms 174A, 174B respectively connected to one or the other actuator points 170A, 172A.

In use, and on actuation thereon, the lever arms 174A, 174B are forced to move in an arc away from the neutral camber line N thereby to impart a primary deforming force on the respective actuator point 170A, 172A so as to cause displacement of such actuator point and consequently, deformation of the symmetrical aerofoil section 114' in a transition condition into the first or second condition 114'A, 114'B.

The actuator structure 168 further comprises one or more biasing means 171 in the form of springs associated with each of the lever arms 174A, 174B for imparting, together with the primary deforming force, a secondary deforming force for aiding in the displacement of the respective actuator point 170A, 172A.

Preferably, the springs 171 are connected at first ends to one or the other of the respective actuator points 170A, 172A or lever arms 174A, 174B, and at opposite second ends to respective fixed points on the primary spar 169, with the fixed points being closer to the leading edge 118 of the aerofoil blade 114 than the points at which the lever arms 174A, 174B are pivotally connected to primary spar 169. In this manner, the secondary deforming force imparted on the aerofoil section 114' increases as the aerofoil section 114' is deformed closer to the first and second conditions 114'A, 114'B.

The springs 171 act as a pre-loading devices thereby to reduce the load for displacing the actuator points 170A, 172A on the actuating means 160 and/or the deforming actuator. Although the biasing means 171 illustrated in the accompanying figures is configured to impart the secondary deforming force as a tension force, it will be appreciated that it may be configured to impart a compression force, where for example, the fixed points are further from the leading edge 118 of the aerofoil blade 114 than the points at which the lever arms 174A, 174B are pivotally connected to primary spar 169, and where the spring is an independent coil spring, or a coil spring fitted over a hydraulic or pneumatic damper.

On release of the actuating means 168, the aerofoil blade 114 resiliently returns to its symmetrical, transition condition 114', where it's inherent force of resilience acts to substantially equalise or overcome at least the secondary deforming force of the biasing means 171.

To aid in the deformation of the aerofoil blade, the actuator structure 168 preferably also includes a secondary spar 173 connected to the primary spar 169 by an elongate actuating connector 175, with the secondary spar 173 pivotally connected across actuator points 170B, 172B located nearer the trailing edge 120 of the aerofoil section 114' as compared to the actuator points 170A, 172A to which the lever arms 174A, 174B are connected.

Where the cam member 162 is rotatable about the first axis of rotation "C", primarily in applications where the support structure 112A is mounted to the ground, riverbed or seabed 200, the power generating device 110 further includes a means 177 for orientating the actuating means 160, and particularly the cam member 162, correctly into the aligned condition relative to the fluid flow direction "D".

In the aligned condition, the secondary diametrical axis "S-S", at or near which the aerofoil blades 114 transition between the first and second conditions 114'A, 114'B, is orientated to lie substantially perpendicularly relative to the fluid flow direction "D". In a preferred embodiment, the orientating means 177 is a fin appendage attached to the cam member 162 and rotatable there with about the first axis of rotation "C".

The power generating device includes a power generation means for operably converting the mechanical energy of the support structure into electrical energy. The power generation means may be configured in many different ways, inclusive of mounting magnets and/or electromagnetics to induce power production of the drive set 16 directly, or alternatively have a power take-off for driving a power generator.

Furthermore, and although not shown, the power generating device may further include a plurality of sensors for sensing, at minimum, the speed of the fluid flow. Where the speed of the fluid flow exceeds a predetermined maximum, the actuating means 60, 160 may be disengaged, for example with a clutch mechanism, such that all of the aerofoil blades 14, 114 return to a symmetrical aerofoil section generating no lift and therefore no torque on the support structure 12, 112.

Although the description following hereon makes reference to components of the first embodiment of the invention 10, it will be appreciated that unless specifically excluded, the description will similarly apply to the second embodiment of the invention 110.

It will be appreciated that the aerofoil blades 14 are capable of automatically setting an angle of attack as a result of the "ruddering" or "weathercocking" effect generated by the reflexed camber aerofoil section, i.e. as a result of the trailing edge 20 being flicked in one or other direction.

The aerofoil sections 14' of each of the aerofoil blades 14 comprise a first aerofoil segment 24 and a second aerofoil segment 26 having ends connected or fixed to one another at the opposing neutral leading and trailing edges 18, 20 thereby preventing the ends of the first and second aerofoil segments 24, 26 from sliding relative to one another.

The first and second aerofoil segments 24, 26 are spaced apart from one another along their lengths across a neutral mean camber line "N" extending between the neutral leading and trailing edges 18, 20 to form the neutral aerofoil section 14' of the aerofoil blade 14, wherein the trailing edge 20 is free to move across the neutral camber line "N".

The first and second aerofoil segments 24, 26 are typically resilient to bias the aerofoil blade 14 towards an initial at rest aerofoil section 14', previously referred to as the symmetrical, transition condition thereof. Furthermore the critical buckling load of the aerofoil segments 24, 26 is greater than a compressive load generated in the aerofoil segments 24, 26 by the actuator deforming the aerofoil blade 14 between the neutral aerofoil section 14' and the reflexed camber aerofoil sections 14'A, 14'B, such that when the aerofoil blade 14 is deformed by the actuator, displacement between two points on one or either of the aerofoil segments generates the compressive load in at least such aerofoil segment, and the ability of such aerofoil segment(s) to resist the compressive load causes such segment(s) to adopt a form with a point of inflection, thereby causing the aerofoil blade 14 to form the reflexed camber aerofoil section 14'A, 14'B.

With reference to FIG. 1 and FIG. 8, each of the aerofoil blades 14 comprise opposing first and second ends 28, 30 across which the leading and trailing edges 18, 20 span. The aerofoil blades 14 are pivotally mounted to at least a base member of the support structure 12A, and preferably also to a operatively upper member 12B thereof on a mast (not shown) passing through the span of each of the aerofoil blades 14, or on stub masts (not shown) passing outwardly from each of the opposing first and second ends 28, 30 thereof.

Preferably, the masts or stub masts are positioned closer to the leading edges 18 than to the trailing edges 20 of the aerofoil blades 14, enabling the aerofoil blades to freely rotate into the required angle of attack about respective second axes of rotation "Q", which second axes of rotation "Q" are substantially parallel to and radially spaced from the first axis of rotation "C".

To counter fluid flow from spilling over the opposing ends 28, 30 of the aerofoil blades 14, each of the ends terminate at an endplate 22. Alternatively, the support structure 12A, 12B may itself double as aerofoil blade endplates.

It will be appreciated that the displacement between the two points on one of the aerofoil segments 24, 26 during deformation of the aerofoil section 14' causes a reduction in distance between those two points and consequently an increase in distance between two reference points on the other of the aerofoil segments 24, 26 and as such, bending in such aerofoil segment 24, 26. The compressive and tensile loads, together with the bending, jointly contribute to the causing of the aerofoil blades 14 to form the reflexed camber aerofoil section 14'A, 14'B, through deformation by the actuating means and deforming actuators.

The first and/or second aerofoil segments 24, 26 may each be formed from a single aerofoil member spanning between the leading and trailing edges 18, 20, or formed from a plurality of aerofoil members connected or fixed end-to-end between the leading and trailing edges 18, 20, jointly forming a continuous closed loop aerofoil rib. In a first alternative embodiment, the first and/or second aerofoil segments 24, 26 may be a single integral aerofoil member forming a continuous closed loop aerofoil rib.

Generally, the aerofoil blades 14 may be formed from a plurality of ribs spaced apart relative to one another to define an elongate aerofoil blade framework for supporting a skin over which fluid is flowable in use, the skin being a continuous closed loop skin member 28 having a trailing edge coinciding with the trailing edge of the aerofoil blade framework.

Typically, the skin member 32 is semi-rigid and resilient to bias, independently or jointly with the aerofoil segments, the aerofoil blades 14 towards the initial at rest section 14', the skin member 32 further having a critical buckling load similar to that of the aerofoil segments 24, 26.

In another embodiment, the first and second aerofoil segments may be opposing first and second members of an elongate aerofoil shell spaced apart from one another across the neutral camber line, the first and second members each being single aerofoil members, a plurality of aerofoil members connected or fixed end-to-end or integral with one another to form a continuous closed loop aerofoil section, and further wherein the outer surface of the shell is the skin 32 over which fluid is flowable in use. Preferably, the shell is self-supporting and semi-rigid.

The materials from which the shells are typically made are preferably stiff, sheet-like materials, for example, strong, rust proof sheet-like materials such as stainless steel or composite materials, having smooth surface finishes to minimise drag.

Preferably, the reflexed camber aerofoil sections 14'A, 14'B are under cambered lifting aerofoil sections, with the aerofoil segment 24, 26 in which the under camber is formed assuming an increasingly tighter concave shape with the aerofoil section progressively deforming from the neutral aerofoil section 14'. More preferably, the assumed concave shape is formed in a location of the aerofoil section within or near a zone of maximum thickness "M" thereof.

The location of the point of inflection created along the deformed segment 24, 26 of the reflexed camber aerofoil section 14'A, 14'B is variable with the varying degrees of deformation of the aerofoil section. The point of inflection in the deformed segment of the reflexed camber aerofoil section is preferably a single point of inflection defined thereon between the leading and trailing edges 18, 20, defining a continuously sinusoidal shape.

Furthermore, the aerofoil section is deformable such that the leading edge 18 is deformed toward one side of the neutral camber line "N" and the trailing edge 20 is deformed to an opposite side of the neutral camber line "N" to form the respective reflexed camber aerofoil section 14'A, 14'B.

According to yet another embodiment of the power generating device 210 as depicted in FIGS. 3 and 4 of the accompanying figures, with like reference numerals designating like components, the aerofoil blades 214, instead of being variable through deformation, are static reflexed camber aerofoil sections 214'.

The aerofoil blades 214 are pivotally supported on respective invertible support substructures 213, which invertible support substructures 213 are pivotally connected to a support structure 212.

Although this embodiment of the power generating device 210 works much in the same way as the first embodiment 10 thereof, it will be appreciated that where the aerofoil sections 214' are static reflexed camber aerofoil sections, it is not possible to deform their shape to alter the direction of lift "L" generated thereby during the primary phase "$R_P$" and secondary phase "$R_S$" of a rotary cycle "R" to maintain the support structure 212 rotating in the same direction.

Accordingly, during the transition phase $R_T$ the aerofoil blades 214 are pivotally inverted by 180 degrees relative to the support structure 212 thereby to effectively reverse the direction in which lift "L" by the aerofoil blades 214 is generated as the aerofoil blades 214 move between the primary phase "$R_P$" and secondary phase "$R_S$" of the rotary cycle "R".

The actuating means in respect of the power generating device 210 of the second embodiment, instead of deforming the aerofoil blades 214 as is the case in the first embodiment of the invention, inverts the support substructures 213 relative to the support structure 212.

It is envisaged that the power generating device (i.e. of either embodiment) further includes at least the following further sensors: a speed measuring sensor for measuring the rotary speed of the drive set; sensors for measuring the direction of the fluid flow; sensors for measuring the position of the aerofoil blades around the rotary cycle "R"; sensors for measuring the production of electrical power (i.e. volt meters, amp meters, etc.); weather sensors for measuring impending weather conditions; strain sensors or gauges for measuring the strain on the aerofoil blades; and impact or G-force sensors for recording strikes on the power generating device that could cause damage, and cameras for visually monitoring the operation of the device.

For the above intelligence is built into the power generating device 10, it will be appreciated that instead of using mechanical actuating means and orientating means, such means may be electronic. For example, the actuating structure may be actuated electronically to deform or invert the aerofoil section of the aerofoil blades to a reflexed camber aerofoil section corresponding to the position thereof sensed by the positional sensor.

It will be appreciated further that the application of the power generating device 10 are vast. For example, the drive sets 16 are capable of being driven in use by wind, thermals and water flows or currents.

To further enhance the efficiency of the power generating device 10 one or more drive sets 16 are mountable within a purpose built housing 34, as depicted in FIG. 11. The housing 34 defines a fluid flow channel 36 for directing fluid flow "D" to impinge the aerofoil blades 14, wherein the fluid flow channel 36 defines an inlet 38 and an outlet 40 with the drive sets 16 positioned intermediate the inlet 38 and the outlet 40 of the fluid flow channel 36.

To speed up the fluid flow impinging the drive sets 16, the fluid flow channel 36 defines a narrowing 42, typically a venturi, between the inlet 38 and the outlet 40 substantially in the vicinity of the drive set. The fluid flow channel 36, at or near the vicinity of the narrowing 42, further defines outwardly extending recesses 44 for creating reverse vortices therein thereby to reduce and/or counter drag generated by the aerofoil blades 14 during the transition phase $R_T$.

Furthermore, the housing 34 includes a diffuser formation at or near the outlet 40 thereof to diffuse the flow back toward its original flow speed. The housing 34 also includes orientating means in the form of fins 46 for operably maintaining the inlet 38 of the housing 34 pointed into the direction of fluid flow "D".

It will be appreciated that where the housing 34 is movable with fluid flow, the orientation of the cam member 62, 162 of the actuating means 60, 160 may be fixed relative to the supporting structure 12, 112, thereby eliminating the need for a rotatable appendage fin.

It is envisaged that the power generating device 10 will have very little impact on sea or bird life due to its ability to operate and very low fluid flow speeds. Furthermore, and specifically for installation in oceanic environments, it is envisaged that the power generating device 10 is sized such that most sea animals will be able to pass through the power generating device 10 unimpeded and without harm. Accordingly, the device will have little effect on existing migration patterns.

Having said that, larger sea animals could be harmed by the device, or conversely damage the device. Accordingly, it is envisage that the inlet 38 will comprise a guard, preferably in the form one or more series of cables or netting extending across the inlet 38, enabling only objects and/or sea animals of a predefined maximum size or smaller to pass there through. Objects and/or sea animals greater than the predefined maximum will be prevented from passing through. Preferably, the inlet 38 into the housing 34 will be angled or slanted such that greater sized objects or sea animals striking the guard will simply be bounced away from the inlet 38.

To further protect the greater sized sea animals, the power generating device 10 will include one or more repellent devices to repel sea animals from swimming too close to the housing inlet 38, for example, sonic and/or electric pulse devices.

The housing 34 illustrated in FIG. 11 is specifically applicable to submerged applications in, for example, oceans and rivers. The housing 34 may be positively, negatively or neutrally buoyant.

In the illustrated embodiment, the housing 34 is positively buoyant and tethered to a seabed or riverbed 200 by a tethering 48, which tethering may be variable in length to lower the housing 34 closer to the sea—or riverbed or raise the housing 34 to the surface, for example, for maintenance. It will be appreciated that the length of the tethering may be variable by a winch or other similar mechanism.

Figure 12:
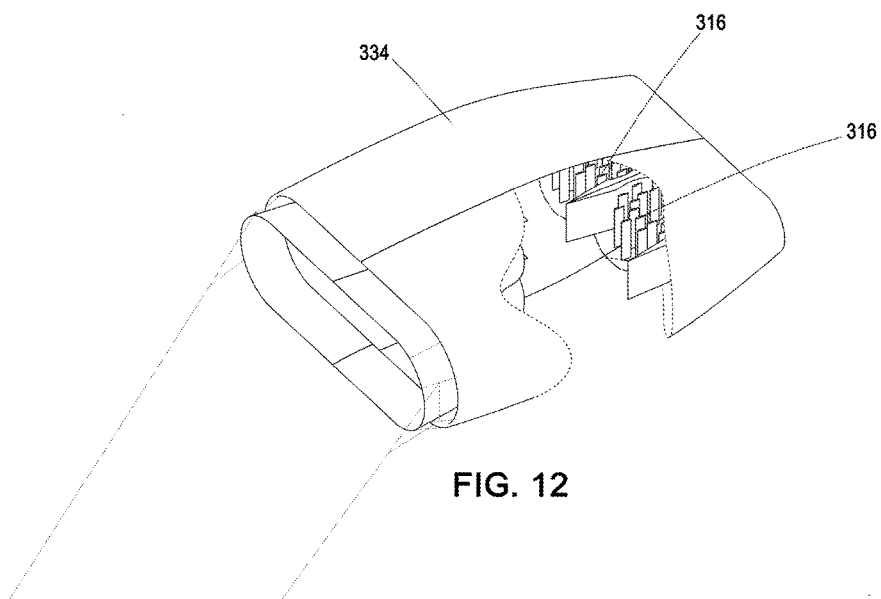
FIG. 12 is a perspective view of an alternative embodiment of the power generating device of FIG. 11, with a pair of drive sets positioned next to one another.

FIG. 12 shows an alternative power generating device housing 334, in which a pair of drive sets 316 are located one next to the other. It will be appreciated that the drive sets 316 could also be spaced one behind the other. Preferably, the housing 334 includes an even number of drive sets 316, spaced next to and/or one behind the other, configured such that half rotate in one direction and the other half rotate in an opposite direction, thereby to minimise transmittal of a torque effect on the housing 334.

Figure 13:
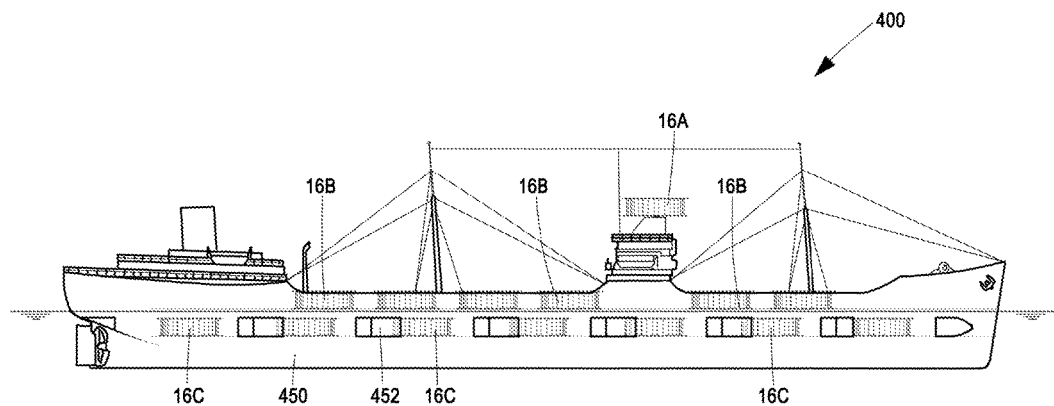
FIG. 13 is a side view of a ship into and/or onto which the power generating devices are installed.
Figure 14:
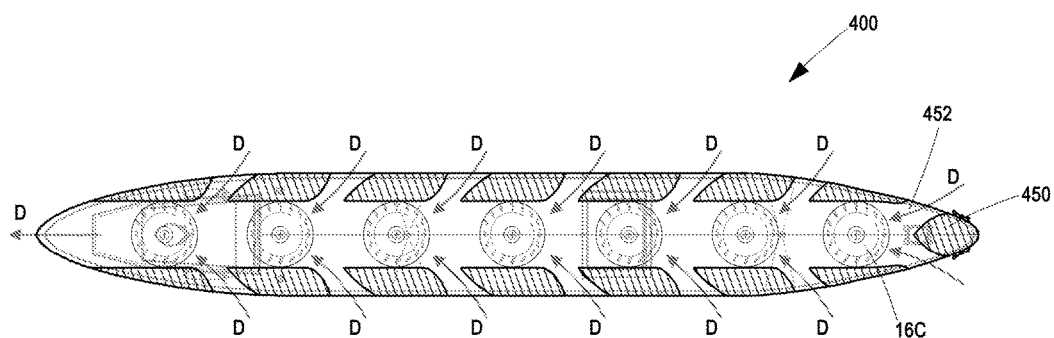
FIG. 14 is a cross-sectional top view of the ship of FIG. 13.

Instead of having the drive sets 16 mounted within purpose built housings, the housings may be the body of an object onto or into which the drive sets 16 are installed. For example, and with reference now to FIGS. 13 and 14, the drive sets:

16A may be mounted on the bridge or other high vantage point on a ship to be powered by the wind, regardless of wind direction, to generate electrical energy to power the normal prop propulsion system of the ship 400, or to provide supplemental power thereto, thereby reducing reliance and cost of fossil fuel;

16B may be mounted at deck level on the ship 400 with that portion of the hull above the water line acting as the housing and defining fluid flow channels to direct wind onto the drive sets 16B; and 16C may be mounted within that portion of the hull 450 below the water line, the hull acting as the housing and defining fluid flow channels 452 to direct water onto the drive sets 16C.

Figure 15:
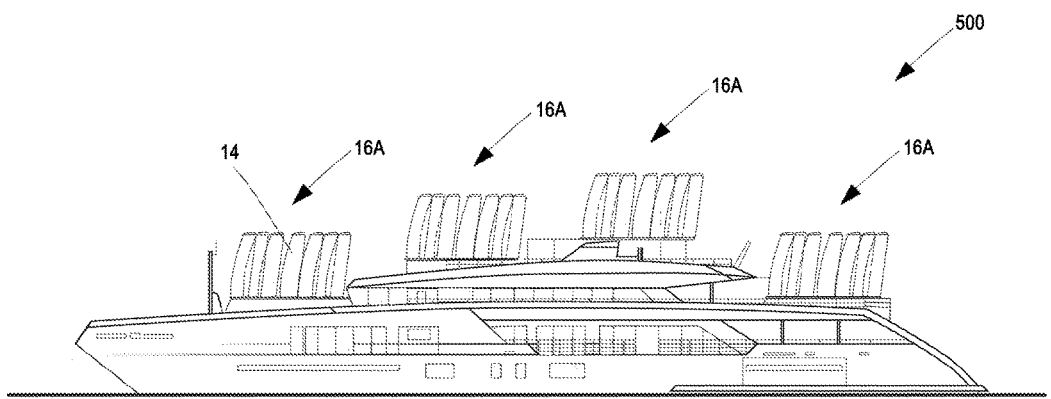
FIG. 15 is a side view of a yacht with a plurality of power generating devices mounted thereon, with the collapsible aerofoil blades in the erected condition.
Figure 16:
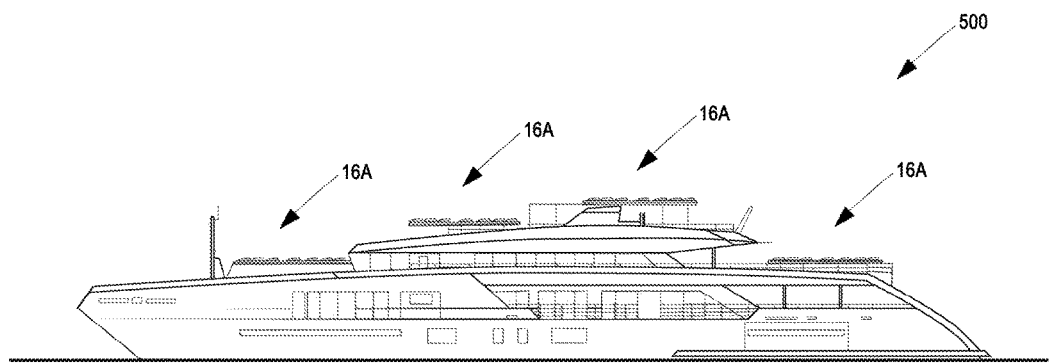
FIG. 16 is a side view of the yacht of FIG. 15 with the collapsible aerofoil blades of the power generating device in the collapsed condition.
Figure 17:
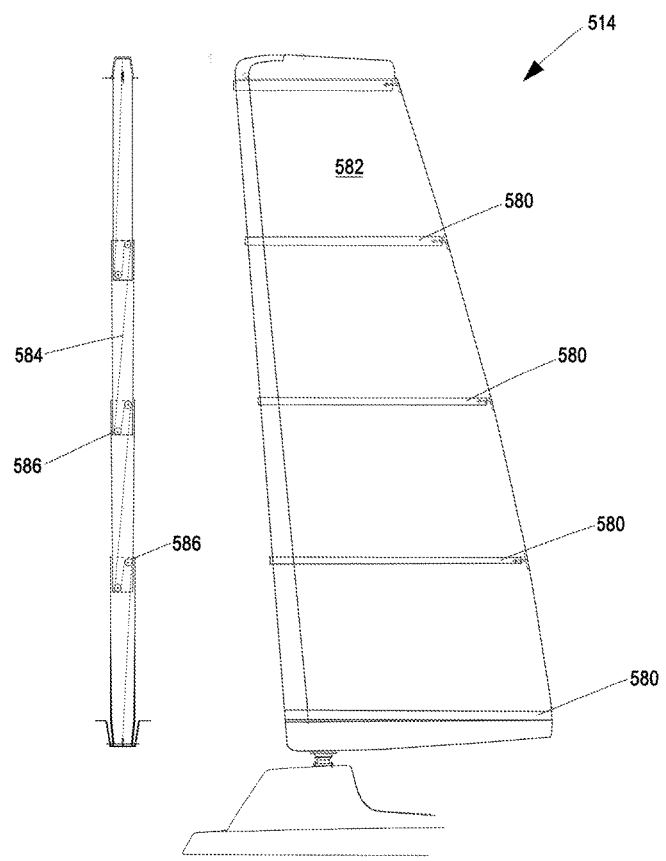
FIG. 17 is a side view of a collapsible aerofoil blade in an erected condition.

With reference to FIGS. 15 and 16 of the accompanying figures, depicting another type of water-going vessel in the form of a yacht 500, the drive sets 16A may include collapsible type aerofoil blades 14. With reference now also to FIG. 17, the collapsible aerofoil blades 514 comprise a plurality of aerofoil section ribs 580 spaced from one another along the span of the aerofoil blade 514 in an erected condition.

Figure 18:
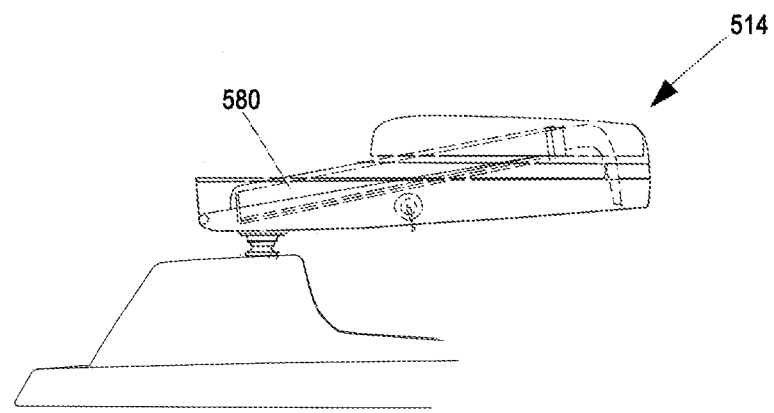
FIG. 18 is a side view of the collapsible aerofoil blade of FIG. 17 in a collapsed condition.

FIG. 18 shows the aerofoil blade 514 in a collapsed condition, with the ribs 580 nested into one another such that the collapsed aerofoil blade 514 is compact, occupying a very shallow height. The collapsible aerofoil blade 514 is compliant with harbour regulations, which typically require that the sails of vessels entering the harbour are retracted. Also, in storm conditions, the ability to collapse the aerofoil blades 514 is advantageous. Other advantages of a collapsible aerofoil blade 514 are longevity of the skin member 582 and avoiding damage thereto in high wind conditions. Many mechanisms may be incorporated to move the aerofoil blade 514 between its erected and collapsed conditions. One type of mechanism, as depicted in FIG. 17, may be a cable 584, threaded through a plurality of pulleys 586.

It will be appreciated that an overturning moment, that would normally be associated where a single aerofoil blade or wingsail is used, is to a large extent eliminated by a balancing effect created by mounting a plurality of aerofoil blades about the first axis of rotation "C", Although the invention has been described above with reference to preferred embodiments, it will be appreciated that many modifications or variations of the invention are possible without departing from the spirit or scope of the invention. For example, the power generating device 10 may be applied at the top of, bottom of or within passages defined in mountains and/or buildings, and/or supported on purpose build support structures.

Furthermore, although the drive sets 16 depicted in the accompanying figures shows a single array of aerofoil blades arranged circumferentially about the first axis of rotations "C", the drive sets 16 may comprise multiple arrays arranged, for example, circumferentially about the first axis of rotations "D" at differing radial distances therefrom.

Figure 19:
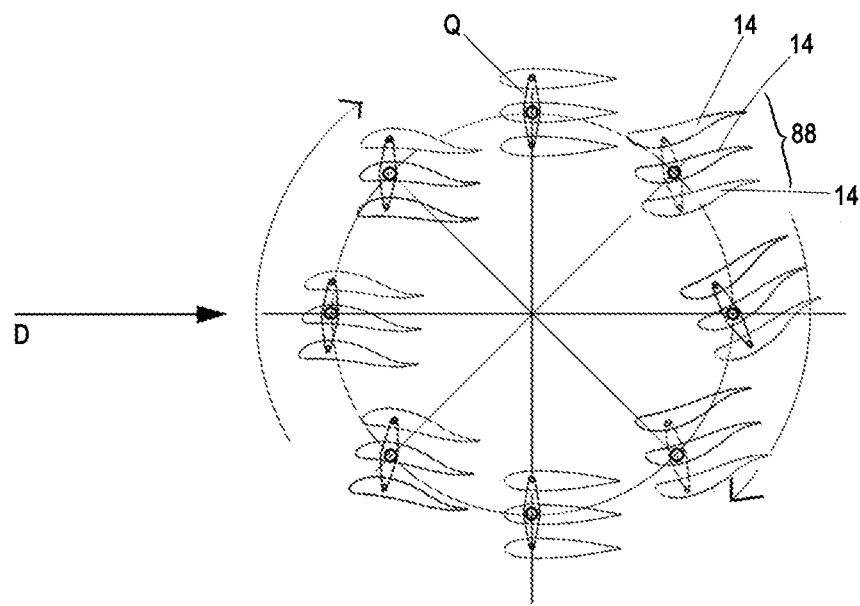
FIG. 19 is a top view of an alternative embodiment of the power generating device with an aerofoil blade set comprising a plurality of aerofoil blades mounted about each second axis of rotation.

With reference now to FIG. 19, and instead of having a single aerofoil blade 14 pivotally mounted about each respective second axis of rotation "Q", an aerofoil blade set 88 incorporating a plurality of (i.e. three) aerofoil blades 14 may be pivotally mounted about each second axis of rotation "Q". In this manner, the power generating capability of the power generating device 10 of the present invention may be significantly increased without a substantial increase in the size of the power generating device 10.

From early stage CFD simulations undertaken by the inventor, it was found that:
the aerofoil blades have self-starting and self-stabilizing characteristics;
the drive sets are applicable to low-speed and high-speed flow applications;
a drive set having a total of twenty four, 8 metre span aerofoil blades with 2.3 metre chord lengths, split into two arrays about the first axis of rotations, will be capable of generating about 8 Megawatts of power with a water flow speed of about 1.4 metres per second; and
a drive set having a total of twelve, 8 metre span aerofoil blades with 4.3 metre chord lengths spaced about the first axis of rotations will be capable of generating about 27 Megawatts of power with a water flow speed of about 1.4 metres per second.

Once extrapolated, it appears that a housing incorporating four drive sets with the 4.3 metre length chord aerofoil blades will be capable of generating about 100 Megawatts of power in a 1.4 metre per second water flow.

The invention claimed is:

1. A power generating device including:
a support structure;
one or more mounts for rotatably mounting the support structure, the support structure being rotatable on the mount(s) about a first axis of rotation;
a plurality of aerofoil blades each being rotatably mounted on the support structure and freely rotatable relative thereto about a respective second axis of rotation, the second axes of rotation each being substantially parallel to and radially spaced from the first axis of rotation; and
a means of actuating each of the aerofoil blades between a first condition, wherein the aerofoil blade has a first lifting aerofoil section for generating a lift force in a first direction thereby to impart a torque on the support structure in a first rotational direction, and a second condition, wherein the aerofoil blade has a second lifting aerofoil section for generating a lift force in a second direction to impart a torque on the support structure in the same first rotational direction such that the support structure is operatively driveable in repeating 360 degree rotary cycles;
wherein the first and the second lifting aerofoil sections are: (i) reversed sections of one another; and (ii) reflexed camber aerofoil sections; such that in use fluid flow acting over the aerofoil blades automatically sets an angle of attack of the aerofoil blades relative to the direction of the fluid flow; and
further wherein the actuating means operably deforms or inverts the aerofoil blades between the first and second conditions.

2. A power generating device according to claim 1 including a means for orientating the support structure and the actuating means relative to the direction of the fluid flow in an aligned condition thereby to enable the actuating means to operatively actuate deformation or inversion of the aerofoil blades between the first and second conditions at predetermined transition regions along the rotary cycle and relative to the fluid flow during respective transition phases.

3. A power generating device according to claim 2, wherein the actuating means and the support structure are fixed relative to one another with at least the support structure mounted on the mounts within a housing defining an inlet, an outlet and a flow path extending there between for enabling fluid flow operatively passing through the housing to impinge on the support structure, the orientating means being located on the housing and in use, orientates the housing such that, in the aligned condition, the flow path is substantially aligned with the direction of the fluid flow with the inlet thereof upstream of the outlet.

4. A power generating device according to claim 3, wherein the flow path defined in the housing between the inlet and outlet thereof has a narrowing within or near which the support structure is mounted thereby to operatively increase the flow rate of the flow passing there through, the housing being at least one of:
(i) rotatably mounted to the ground, a building, a vessel, or a supporting structure, thereby enabling the housing to operatively rotate into the aligned condition; and
(ii) buoyant and tethered in a submerged state thereby enabling the housing to operatively drift into the aligned condition.

5. A power generating device according to claim 4, wherein at least the support structure, the aerofoil blades rotatably mounted thereon and the actuating means make up a drive set, with the housing capable of housing a plurality of drive sets therein, the housing including a guard at or near the inlet for preventing at least one of solid materials and sea animals of a size greater than a predefined maximum to enter at least one of the housing and a diffuser near the outlet of the housing.

6. A power generating device according to claim 2, wherein the actuating means is rotatable relative to the supporting structure, and further wherein the orientating means is connected to the actuating means thereby to move the actuating means about the first axis of rotation such that both the support structure and the actuating means are operatively orientated to the direction of the fluid flow in an aligned condition to enable the actuating means to operatively actuate deformation or inversion of the aerofoil blades at the predetermined transition regions along the rotary cycle and relative to the fluid flow during the respective transition phases.

7. A power generating device according to claim 2, wherein the mechanical actuating means is made up of:
(i) a cam member;
(ii) at least one cam follower associated with each of the aerofoil blades, wherein the cam follower is operatively caused to move as it rides along a profile of the cam member as the support structure rotates through the rotary cycle;
(iii) deforming or inverting actuators for respectively actuating deformation or inversion of the respective aerofoil blade; and
(iv) means for transmitting the reciprocal movement of the cam follower to the deforming or inverting actuators of the respective aerofoil blade thereby to operatively retain the aerofoil blade in the first or second condition, and/or to deform or invert the aerofoil blade between the first and second conditions during the transition phases;
characterized in that:
the cam member is mounted remotely from the support structure with the first axis of rotation passing there through, and the cam followers are mounted on the support structure; or
the cam member is mounted on the support structure or the aerofoil blade, and the cam followers are mounted on the other of the support structure or the aerofoil blade, with the second axis of rotation passing through the cam member.

8. A power generating device according to claim 7, wherein the aerofoil blades on diametrically opposing sides of the support structure, across a diametric axis passing through the first axis of rotation, are deformable or invertible during the transition phases between the first and second conditions, characterized in that:
the aerofoil blades lying on:
(i) a first side of the diametric axis and spaced therefrom, are operatively retainable in the first condition during a primary drive phase of the rotary cycle by the actuating means; and
(ii) a second side of the diametric axis and spaced therefrom, are operatively retainable in the second condition during a secondary drive phase of the rotary cycle by the actuating means;
such that in use, the rotary cycle is made of a primary drive phase—transition phase—secondary drive phase—transition phase sequence, where the drive phases and transition phases are located along diametrical opposing drive phase segments and the transition phases segments about the first axis of rotation.

9. A power generating device according to claim 8, wherein the aerofoil blades each have opposing leading and trailing edges and, operatively under the force of the fluid flow acting there over, automatically rotate to set an angle of attack with the aerofoil blades lying on both sides of the diametric axis being orientated such that their respective leading edges are upstream of their trailing edges.

10. A power generating device according to claim 9, wherein the support structure, relative to the first axis of rotation, comprises a plurality of radially extending booms on which the aerofoil blades are supported, the aerofoil blades being rotatably and pivotally mounted on the booms thereby to enable the aerofoil blades to invert under the actuation of the inverting actuators during the transition phases, and further wherein the aerofoil blades have a static reflexed camber aerofoil section.

11. A power generating device according to claim 10, wherein the aerofoil blades have opposing first and second ends across which the leading and trailing edges extend thereby defining a blade span, and further wherein the aerofoil blades are rigid or collapsible across such blade spans.

12. A power generating device according to claim 9, wherein the aerofoil blades have a deformable aerofoil section and capable of, on actuation thereon by the actuating means, deforming between the first and second conditions fully or incrementally, characterised in that the aerofoil blades, in either of the first or the second conditions, are operatively exposable to a first rotation force, in the force of a rotational force imparted thereon whilst maintaining an angle of attack relative to the fluid flow, and a second rotation force, imparted thereon by the actuating means, wherein a resultant force between the first and the second rotation forces consequentially cause relative movement between the cam member and the cam followers, thereby to deform the aerofoil blades.

13. A power generating device according to claim 12, wherein the aerofoil sections of the deformable aerofoil blades have: (a) a sliding joint; or (b) a continuous closed loop form, each of the aerofoil sections comprising of a first aerofoil segment and a second aerofoil segment having ends connected or fixed to one another at the opposing leading and trailing edges thereby preventing the ends of the first and second aerofoil segments from sliding relative to one another, wherein the first and second aerofoil segments are spaced apart from one another along their lengths across a neutral mean camber line extending between the leading and trailing edges to form the aerofoil section of the aerofoil blade, and further wherein the trailing edge is free to move across the neutral camber line, characterised in that:
(i) the deforming actuators deform the aerofoil blade between the first and the second conditions;
(ii) the first and second aerofoil segments are resilient to bias the aerofoil blade towards a symmetrical transition condition through which condition the aerofoil blade passes as it is deformed between the first and second conditions; and
(iii) the critical buckling load of the aerofoil segments is greater than a compressive load generated in the aerofoil segments by the deforming actuators during deformation thereof between the transition condition and the first and second conditions;
such that when the aerofoil blade is deformed, displacement between two points on one of the aerofoil segments generates the compressive load in at least such aerofoil segment, and the ability of such aerofoil segment to resist the compressive load cases such segments to adopt the reflexed camber aerofoil section form having a reflexed camber line with a point of inflection located nearer the trailing edge than to the leading edge, with the trailing edges on the aerofoil blades on opposite sides of the diametric axis being flicked towards opposite directions.

14. A power generating device according to claim 13, wherein the first and/or second aerofoil segments are:
(i) each formed from a single aerofoil member spanning between the leading and trailing edges, jointly forming a continuous closed loop aerofoil rib;

(ii) each formed from a plurality of aerofoil members connected or fixed end-to-end between the leading and trailing edges, jointly forming a continuous closed loop aerofoil rib;

(iii) a single integral aerofoil member forming a continuous closed loop aerofoil rib such that the aerofoil blade comprises a plurality of aerofoil ribs spaced apart relative to one another to define an elongate aerofoil blade framework for supporting a flexible or semi-rigid skin there over, the skin being a continuous closed loop skin member having a trailing edge coinciding with the trailing edge of the aerofoil blade framework; or (iv) opposing first and second members of an elongate aerofoil shell spaced apart from one another across the neutral camber line, the first and second members each being single aerofoil members, a plurality of aerofoil members connected or fixed end-to-end, or integral with one another to form a continuous closed loop aerofoil section, wherein the outer surface of the shell is a skin over which fluid is flowable in use, and further wherein the shell is self-supporting and semi-rigid.

15. A power generating device according to claim 14, wherein the aerofoil blades have opposing first and second ends across which the leading and trailing edges extend thereby defining a blade span, and further wherein the aerofoil blades are rigid or collapsible across such blade spans.

16. A power generating device according to claim 15, wherein the collapsible aerofoil blades comprise a plurality of aerofoil ribs spaced relative to one another across the blade span of the aerofoil blades, and further wherein the first and second ends of the aerofoil blades are movable relative to one another between an erected condition, wherein the first and second ends of the aerofoil blades are spaced remotely from one another thereby to stretch the skin member between such ends and over the aerofoil ribs spaced there between, and a collapsed condition, wherein the first and second ends of the aerofoil blades are brought into close proximity with one another, consequently causing the aerofoil ribs to collapse onto or into one another.

17. A power generating device according to claim 16, wherein the deforming actuators are configured to act on one or more movable actuating members of an actuating structure substantially located within a hollow interior of the respective aerofoil blade and in contact with or connected to actuator points on the aerofoil blade, the movable actuating members being movable on actuation thereon by the actuating means and deforming actuators to impart a primary deforming force for displacing one or more actuator points on the first and second aerofoil segments thereby to deform the aerofoil blade section between the transition condition and at least one of the first and second reflexed camber aerofoil section conditions.

18. A power generating device according to claim 17 including one or more biasing means for imparting, together with the primary deforming force, a secondary deforming force for aiding in the displacement of the actuator points, thereby reducing the load on the deforming actuators to deform the aerofoil blades between the transition condition and at least one of the first and/or second reflexed camber aerofoil section conditions, the aerofoil blades being resiliently biased towards the transition condition.

19. A power generating device according to claim 18, wherein the one or more biasing means are springs acting between a fixed point within the hollow interior of the aerofoil blade and a movable point on the movable actuating members or aerofoil blade.

20. A power generating device according to claim 19, wherein the actuating structure comprises:

a primary spar located within the hollow interior of the aerofoil blade;

a pair of the movable actuating members, each having first ends movably connected to the primary spar and second ends connected to or abutting the actuator points on one or the other of the first and second aerofoil segments of the aerofoil blade;

the biasing means in, the form of a spring, associated with each movable actuating member, and connected at one end to the movable actuating member or the respective aerofoil segment and at the opposite end to the fixed point, the fixed point being on the primary spar and nearer the leading edge of the aerofoil blade than the point at which the movable actuating members are movably connected to the primary spar; and at least one of:

(i) a secondary spar located within the hollow interior of the aerofoil blade such that the primary and secondary spars are located closer to the leading and trailing edges of the aerofoil blade respectively, the secondary spar being connected to or abutting secondary actuator points on one or the other of the first and second aerofoil segments of the aerofoil blade; and (ii) an elongate actuating connector extending from the primary spar at one end thereof and having a second end pivotally connected to the secondary spar.

21. A power generating device according to claim 20, wherein the actuating structure is constructed into each aerofoil rib, with the primary spar being part of or movable on a collapsible mast through which the second axis of rotation of the aerofoil blades operatively extends, the aerofoil blades being rotatably mounted on the support structure by: (i) a mounting shaft about which the mast is rotatable; or (ii) on stub masts extending from each of the first and second ends of the aerofoil blade.

22. A power generating device according to claim 21, wherein the support structure is a pair of discs spaced apart by the aerofoil blades rotatably mounted there between, and further wherein the support structure comprises a power take-off from which the rotary movement of the support structure is operatively capable of being drawn from for driving a power generation means for operably converting the mechanical energy of the support structure into electrical energy.

23. A power generating installation including:

a rotatably mounted support structure being rotatable about a first axis of rotation;

a plurality of aerofoil blades rotatably mounted on the support structure and freely rotatable relative thereto about a respective second axis of rotation being substantially parallel to and radially spaced from the first axis of rotation;

the support structure being drivable in repeating 360 degree rotary cycles by lift forces imparted thereon by the aerofoil blades and generated from fluid flow passing there over in a fluid flow direction;

wherein the aerofoil blades, in a transition region of the support structure where a transition line that passes through the first axis of rotation is perpendicular to the fluid flow direction, is deformable or invertible between:

(i) a first condition, during a primary phase of the rotary cycle, in which the aerofoil blades have a first reflexed camber aerofoil section for generating a lift force in a first direction thereby to impart a torque on the support structure in a first rotational direction; and (ii) a second condition, during a secondary phase of the rotary cycle, in which the aerofoil blades have a second reflexed camber aerofoil section for generating a lift force in a second direction thereby to impart a torque on the support structure in the first rotational direction;

and further wherein the aerofoil blades are freely rotatable throughout the rotary cycle in response to forces induced on the aerofoil blades by fluid flow passing there over; and a power generation means for operably converting the mechanical energy of the support structure into electrical energy.

24. A power generating installation according to claim 23, wherein the transition region, with reference to the first axis of rotation, is a pair of diametrically opposing transition sectors overlying the transition line.

25. A power generating method including the steps of:

(A) exposing a plurality of aerofoil blades rotatably mounted on a support structure to a fluid flow thereby to generate lift forces and rotatably drive the support structure about a first axis of rotation in repeating 360 degree rotary cycles;

(B) deforming or inverting the aerofoil blades, in a transition region of the support structure where a transition line that passes through the first axis of rotation is perpendicular to the fluid flow direction, between:

(i) a first condition, during a primary phase of the rotary cycle, in which the aerofoil blades have a first reflexed camber aerofoil section for generating a lift force in a first direction thereby to impart a torque on the support structure in a first rotational direction; and (ii) a second condition, during a secondary phase of the rotary cycle, in which the aerofoil blades have a second reflexed camber aerofoil section for generating a lift force in a second direction thereby to impart a torque on the support structure in the first rotational direction;

(C) converting the mechanical energy of the support structure into electrical energy;

wherein the aerofoil blades are freely rotatable throughout the rotary cycle in response to forces induced on the aerofoil blades by fluid flow passing there over.

* * * * *

UNITED STATES PATENT AND TRADEMARK OFFICE
CERTIFICATE OF CORRECTION

| | |
|---|---|
| PATENT NO. | : 10,502,184 B2 |
| APPLICATION NO. | : 15/511169 |
| DATED | : December 10, 2019 |
| INVENTOR(S) | : Robert Reginald Bray |

It is certified that error appears in the above-identified patent and that said Letters Patent is hereby corrected as shown below:

In the Specification

Column 12, Line 43, "deforming the aerofoil section 141." should read -- deforming aerofoil section 14¹. --

In the Claims

Column 21, Line 16, "(iv) means for transmitting the reciprocal movement of" should read -- (iv) means for transmitting the movement of --

Signed and Sealed this
Twenty-first Day of January, 2020

Andrei Iancu
*Director of the United States Patent and Trademark Office*